United States Patent
Mikami

(10) Patent No.: US 9,834,465 B2
(45) Date of Patent: Dec. 5, 2017

(54) OPTICAL GLASS AND METHOD FOR PRODUCING THE SAME

(71) Applicant: HOYA CORPORATION, Tokyo (JP)

(72) Inventor: Shuhei Mikami, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/917,841

(22) PCT Filed: Sep. 26, 2014

(86) PCT No.: PCT/JP2014/075631
§ 371 (c)(1),
(2) Date: Mar. 9, 2016

(87) PCT Pub. No.: WO2015/046428
PCT Pub. Date: Apr. 2, 2015

(65) Prior Publication Data
US 2016/0214881 A1    Jul. 28, 2016

(30) Foreign Application Priority Data
Sep. 30, 2013   (JP) .................................. 2013-205170

(51) Int. Cl.
*C03C 3/16* (2006.01)
*C03C 3/21* (2006.01)
*C03B 5/193* (2006.01)
*C03C 3/064* (2006.01)
*C03B 5/06* (2006.01)
*C03B 5/167* (2006.01)
*C03B 5/16* (2006.01)

(52) U.S. Cl.
CPC ................ *C03B 5/193* (2013.01); *C03B 5/06* (2013.01); *C03B 5/16* (2013.01); *C03B 5/167* (2013.01); *C03C 3/064* (2013.01); *C03C 3/16* (2013.01); *C03C 3/21* (2013.01); *Y02P 40/57* (2015.11)

(58) Field of Classification Search
CPC .. C03C 3/21; C03C 3/16; C03C 3/064; C03B 5/16; C03B 5/43; C03B 5/193; C03B 11/005
See application file for complete search history.

(56) References Cited

U.S. PATENT DOCUMENTS

| 2002/0073735 A1* | 6/2002 | Hayashi ................ C03B 11/005 65/32.1 |
| 2011/0126976 A1 | 6/2011 | Kikutani et al. |
| 2013/0135714 A1 | 5/2013 | Kondo et al. |
| 2013/0305786 A1 | 11/2013 | Kikutani et al. |
| 2015/0203397 A1* | 7/2015 | Mikami .................... C03C 3/21 501/46 |
| 2015/0218041 A1* | 8/2015 | Mikami .................... C03C 3/21 65/66 |

FOREIGN PATENT DOCUMENTS

| JP | 2007-265803 A | 10/2007 | |
| JP | 2010-057893 A | 3/2010 | |
| JP | 2011-042556 A | 3/2011 | |
| JP | 2011-046550 A | 3/2011 | |
| JP | 2011-246344 A | 12/2011 | |
| JP | 2011246344 A * | 12/2011 | ............. C03B 5/193 |
| JP | 2014-024748 A | 2/2014 | |
| JP | 2014-024749 A | 2/2014 | |
| JP | 2014-224024 A | 12/2014 | |
| JP | 2014-224025 A | 12/2014 | |
| JP | 2014-224026 A | 12/2014 | |
| WO | 2012/018026 A1 | 2/2012 | |
| WO | 2013/191270 A1 | 12/2013 | |
| WO | 2013/191271 A1 | 12/2013 | |

OTHER PUBLICATIONS

Jan. 6, 2015 International Search Report issued in International Patent Application No. PCT/JP2014/075631.

* cited by examiner

*Primary Examiner* — Elizabeth A Bolden
(74) *Attorney, Agent, or Firm* — Oliff PLC

(57) ABSTRACT

An optical glass may be a phosphate based glass containing at least any one of oxides selected from $TiO_2$, $Nb_2O_5$, $WO_3$, and $Bi_2O_2$. The total content (HR) of the $TiO_2$, $Nb_2O_5$, $WO_3$, and $Bi_2O_2$ may be 35 mol % or above, the noble metal content may be less than 2.0 ppm, and the βOH value, given by the following general formula, may be 0.1 mm-1 or above: $\beta OH = -[\ln(B/A)]/t$.

7 Claims, No Drawings

OPTICAL GLASS AND METHOD FOR PRODUCING THE SAME

BACKGROUND OF THE INVENTION

1. Description of the Related Art

Recently, with high functionality and compactness of an apparatus, such as an imaging optical system or a projection optical system, there has been a growing demand for an optical glass having a high refractive index as a material of an effective optical element.

The optical glass (hereinafter simply referred to as a "glass") having the high refractive index usually contains a large amount of high refractive index components, for example, Ti, Nb, W, Bi or the like, as glass components. Since these components are easily reduced during the melting of the glass and the reduced components absorb short-wavelength light in a visible light region, they may cause an increase in coloring (hereinafter sometimes referred to as "reduction color") of the glass.

In order to solve the problem, technique of thermally treating the colored glass again and thereby decreasing the reduction color has been known. However, this method is problematic in that, if the coloring of the glass is too dark before the thermal treatment, a sufficient decrease in the reduction color may not be achieved even by the thermal treatment. Hence, a glass composition having a larger amount of high refractive index components makes it difficult to decrease the reduction color.

In contrast, Patent Document 1 has proposed technique that is intended to decrease the reduction color of a glass in a melting process, by producing an oxidizing gas from a glass raw material in the melting process and thereby inhibiting a high refractive index component from being reduced. According to this technique, it is possible to manufacture an optical glass that is decreased in reduction color, even if the glass has a composition containing a large amount of high refractive index components, like a borate bismuth-based glass.

However, in the case of manufacturing a phosphate-based optical glass using this technique, a problem where a noble metal material constituting a melting vessel dissolves in the molten glass may become serious.

Generally, a noble metal material, such as platinum having high heat resistance or corrosion resistance, is widely used as a material constituting the melting vessel such as a crucible. A melting instrument made of the noble metal material is needed to mass produce glass that is very high in homogeneity, for example, an optical glass. However, high temperature generated during the melting may sometimes cause noble metal such as platinum to react with oxygen contained in a melting atmosphere (e.g. air) and thereby produce a noble metal oxide (e.g. $PtO_2$ etc.). Such a noble metal oxide dissolves in the glass through a surface of a melting product. Further, when the glass containing a large amount of high refractive index components is melted, the noble metal material may be oxidized and dissolve in the molten glass in the form of noble metal ions (e.g. $Pt^{4+}$ etc.).

The noble metal ions (containing the noble metal oxide) dissolved in the molten glass absorb visible light, thus leading to an increase in coloring (coloring derived from the noble metal ions) in the optical glass as a final product. In addition, the optical glass containing noble metal such as platinum causes deterioration in transmittance of the glass due to ultraviolet radiation (solarization). Therefore, when the optical glass is manufactured, it is required to inhibit the noble metal from being eluted into the molten glass.

Typically, the higher the melting temperature of the glass is, the more the amount of the noble metal dissolved in the molten glass is. Thus, when the phosphate-based optical glass (having high glass transition temperature Tg) whose melting temperature is required to be set to be higher than that of the borate bismuth-based glass is manufactured, the dissolving of the noble metal in the molten glass becomes a more serious problem.

In the case of manufacturing this phosphate-based optical glass, technique (producing the oxidizing gas from the glass raw material in the melting process) of Patent Document 1 may decrease the reduction color of the glass, but causes the noble metal to be dissolved in the molten glass. Consequently, sufficient improvement in transmittance cannot be expected.

In contrast, Patent Document 2 has proposed technique of achieving both a decrease in a reduction color and a decrease in amount of dissolved noble metal when the phosphate-based optical glass is manufactured. This method may promote the discharge of excess oxygen components in a melting atmosphere by bubbling non-oxidizing gas in the molten glass, and may prevent the noble metal constituting the melting vessel from being eluted in the glass. Further, since this method may appropriately adjust the concentration of an oxygen component in the molten glass, it is possible to prevent the oxygen component from being excessively discharged from the molten glass, and thereby it is also possible to inhibit the reduction of the high refractive index component.

However, in the case of using reduction gas (carbon monoxide etc.) as the non-oxidizing gas, metal ions of Ti, Nb, W, Bi or the like in the molten glass are excessively reduced, and the reduced metal and the noble metal constituting the melting vessel are alloyed, thus undesirably causing the strength and durability of the melting vessel to be considerably lowered. Further, since an inert gas such as Ar is more expensive than other gases, the use of the inert gas as the non-oxidizing gas may lead to an increase in cost.

Furthermore, such a method may decrease the amount of the noble metal dissolved in the molten glass. However, since a melting operation is performed under the melting atmosphere where oxygen partial pressure is low, the reduction of the high refractive index component is performed, so that the coloring of the glass becomes dark. It is impossible to sufficiently mitigate the coloring, even if this glass is subjected to the thermal treatment.

Therefore, a glass (moreover, optical glass of a high refractive index having excellent transmittance) and a method for manufacturing the glass are required, which are capable of drastically decreasing a reduction color of the glass while keeping a noble metal content low.

CITATION LIST

Patent Document (Patent Document 1) Japanese Patent Laid-Open Publication No. 2011-042556
(Patent Document 2) Japanese Patent Laid-Open Publication No. 2011-246344

SUMMARY OF THE INVENTION

Technical Problem

Accordingly, the present invention has been made keeping in mind the above problems occurring in the related art, and an object of the present invention is to provide an optical glass that is a phosphate-based glass and has a high refractive index and excellent transmittance and a method for producing the optical glass.

Solution to Problem

The present inventors have conducted extensive research to achieve the aforementioned object, and consequently have found that the dissolving of noble metal derived from a melting vessel can be effectively prevented and the coloring of a glass can be significantly mitigated after thermal treatment, by carrying out at least one of treatment of adding water vapor to a melting atmosphere or treatment of bubbling water vapor in a melting product in a melting process, in a phosphate-based glass containing a large amount of high refractive index components. On the basis of this finding, the inventors have completed the present invention.

That is, the gist of the present invention is as follows.

An optical glass that is a phosphate-based glass containing at least one oxide selected from the group consisting of $TiO_2$, $Nb_2O_5$, $WO_3$ and $Bi_2O_3$, wherein a total content (HR) of the $TiO_2$, $Nb_2O_5$, $WO_3$ and $Bi_2O_3$ is 35 mol % or more, a content of noble metal is less than 2.0 ppm, and a value of βOH represented by the following equation (1) is 0.1 $mm^{-1}$ or more:

$$βOH=-[\ln(B/A)]/t \qquad (1)$$

wherein in the equation (1), t denotes a thickness (mm) of the glass used for a measurement of an external transmittance, A denotes the external transmittance (%) at a wavelength of 2500 nm when a light enters into said glass in parallel to a thickness direction thereof, B denotes the external transmittance (%) at the wavelength of 2900 nm when a light enters into said glass in parallel to the thickness direction thereof. Further, in the equation (1), ln is a natural logarithm.

[2] A method for producing an optical glass, wherein the method has a melting process that obtains a molten glass by heating and melting a glass raw material containing phosphorus and a glass raw material containing at least one component selected from the group consisting of $TiO_2$, $Nb_2O_5$, $WO_3$ and $Bi_2O_3$, in a melting vessel made of noble metal, a total content (HR) of the $TiO_2$, $Nb_2O_5$, $WO_3$ and $Bi_2O_3$ in the glass raw materials is 35 mol % or more, and at least one of a treatment (ia) of adding water vapor to a melting atmosphere and a treatment (ib) of bubbling water vapor in a melting product is carried out in the melting process.

[3] The method for producing the optical glass described in [2], wherein a non-oxidizing gas may be supplied together with the water vapor in either or both of the treatment (ia) and the treatment (ib).

[4] The method for producing the optical glass described in [3], wherein the non-oxidizing gas may comprise at least one selected from the group consisting of argon, nitrogen, carbon monoxide, carbon dioxide, hydrogen, helium and iodine.

[5] The method for producing the optical glass described in [3] or [4], wherein a ratio occupied by the water vapor in the gas being supplied may be 3 volume % or more and less than 100 volume %, and a ratio occupied by the non-oxidizing gas in the gas being supplied may be more than 0 volume % and 97 volume % or less.

[6] The method for producing the optical glass described in any one of [2] to [5], wherein the optical glass may be a phosphate-based glass.

[7] The method for producing the optical glass described in any one of [2] to [6], further including thermally treating the optical glass under an oxidizing atmosphere.

Advantageous Effects of the Invention

According to the present invention, an optical glass of a high refractive index that consists of a phosphate-based glass is obtained, which has a very small content of noble metal derived from a melting vessel and is very significantly improved in transmittance after thermal treatment. Such an optical glass of the present invention has very high transmittance especially after thermal treatment.

DETAILED DESCRIPTION OF EXEMPLARY EMBODIMENTS

Optical Glass

An optical glass (hereinafter simply referred to as a "glass") of the present invention is a phosphate-based glass that contains at least one oxide (hereinafter simply referred to as a "high refractive index component") selected from the group consisting of $TiO_2$, $Nb_2O_5$, $WO_3$ and $Bi_2O_3$ as a glass component, and is characterized in that a total content (HR) of the $TiO_2$, $Nb_2O_5$, $WO_3$ and $Bi_2O_3$ is 35 mol % or more, a content of noble metal is less than 2 ppm, and a value of βOH represented by the following equation (1) is 0.1 $mm^{-1}$ or more:

$$βOH=-[\ln(B/A)]/t \qquad (1)$$

Here, in the equation (1), t denotes a thickness (mm) of the glass used for a measurement of an external transmittance, A denotes the external transmittance (%) at a wavelength of 2500 nm when a light enters into said glass in parallel to a thickness direction thereof, B denotes the external transmittance (%) at the wavelength of 2900 nm when a light enters into said glass in parallel to the thickness direction thereof. Further, in the equation (1), ln is a natural logarithm. The unit of βOH is $mm^{-1}$.

Further, the term "external transmittance" means the ratio (Iout/Iin) of the intensity "Iout" of the transmitted light which transmitting out the glass to the intensity "Iin" of incident light which enters into the glass, that is, the transmittance considering the surface reflection at the glass surface as well; and the term "internal transmittance" which will be described below means the transmittance in case there is no surface reflection at the glass surface (that is, the transmittance of a glass material itself forming the glass). Each transmittance can be obtained by measuring a transmission spectrum using a spectrophotometer.

In addition, the term "phosphate-based glass" means an optical glass that contains $P_2O_5$ as a glass component, has a $P_2O_5$ content greater than a $SiO_2$ content as well as a $B_2O_3$ content by mol %. For example, this glass includes an optical glass having a $P_2O_5$ content of 5 mol % or more. A glass having the content of $P_2O_5$ greater than a total content of $SiO_2$ and $B_2O_3$ by mol % is preferred as the phosphate-based optical glass.

Further, since the optical glass of the present exemplary embodiment is a high refractive index glass, this contains a large amount of high refractive index components. In addition, a total content (HR) of $TiO_2$, $Nb_2O_5$, $WO_3$ and $Bi_2O_3$ is 35 mol % or more. Preferably, the lower limit of HR is 37 mol %, more preferably 38 mol %, much more preferably 38.5 mol %, even more preferably 39 mol %, still more preferably 40 mol %, still even more preferably 43 mol %, and even much more preferably 50 mol %. Further, the upper limit of HR is preferably 85 mol %, more preferably 80 mol %, and much more preferably 75 mol %.

In the optical glass of the present exemplary embodiment, a noble metal content is less than 2 ppm. That is, although the optical glass of the present exemplary embodiment contains noble metal, its content is less than 2 ppm, and a dissolved amount of the noble metal, such as platinum, used as a material of a vessel or an instrument for melting the glass is very little.

Since noble metal ions dissolved in the molten glass typically absorbs visible light, the coloring of the glass is undesirably increased. However, since the noble metal content in the optical glass of the present exemplary embodiment is sufficiently reduced as described above, there is little coloring or solarization derived from the noble metal ions, and noble-metal foreign matter is also reduced. Consequently, the transmittance is excellent.

Particularly, in terms of a reduction in coloring of the glass, a reduction in solarization, a reduction in noble-metal foreign matter, an improvement in transmittance and the like resulting from the noble metal ions, the noble metal content of the optical glass of the present exemplary embodiment preferably has an upper limit value as low as possible. It is more preferable that the upper limit value becomes lower in order of 1.8 ppm, 1.6 ppm, 1.4 ppm, 1.2 ppm, 1.1 ppm, 1.0 ppm and 0.9 ppm. Although a lower limit of the noble metal content is not limited particularly, the noble metal of about 0.001 ppm is inevitably included.

Examples of the noble metal may include single metal such as Pt, Au, Rh or Ir, and an alloy such as a Pt alloy, an Au alloy, a Rh alloy or an Ir alloy. Among the noble metal, Pt or Pt alloy that is excellent in heat resistance and corrosion resistance is preferred as the material of the melting vessel or the melting instrument.

Therefore, the glass produced using the melting vessel or the melting instrument made of Pt or Pt alloy preferably contains Pt less than 2 ppm. A more preferable upper limit of the Pt content is the same as a more preferable upper limit of the noble metal content included in the glass. Further, a lower limit of the Pt content is not limited particularly, but Pt of about 0.001 ppm is inevitably included.

Further, in the optical glass of the present exemplary embodiment, the value of βOH represented by the aforementioned equation (1) is 0.1 mm$^{-1}$ or more. Although the optical glass of the present exemplary embodiment has the phosphate-based composition containing a large amount of high refractive index components, such as Ti, Nb, W or Bi, as the glass component, the reduction color of the glass can be efficiently decreased by the thermal treatment.

The reason why the reduction color may be dramatically mitigated after the thermal treatment in the optical glass of the present exemplary embodiment is not clear, but the inventor guesses as follows.

Generally, in the case of the glass composition containing a large amount of high refractive index components such as Ti, Nb, W or Bi as the glass component, these high refractive index components are reduced in the process of melting the glass, thus absorbing the short-wavelength light in the visible light region and consequently undesirably increasing the coloring (hereinafter sometimes referred to as the reduction color) of the obtained optical glass.

In order to solve the problem, the optical glass exhibiting the reduction color is thermally treated under the oxidizing atmosphere, so that it is possible to decrease the coloring of the glass. Such a phenomenon is considered due to each ion of Ti, Nb, W or Bi in a reduction state being oxidized and the visible-light absorption of each ion being diminished.

However, in the case that the oxidation rate for Ti, Nb, W, Bi or the like in the glass is slow even if the glass is thermally treated under the oxidizing atmosphere, the effect of decreasing the coloring remains small. Therefore, in order to reduce the coloring in a short time, it is necessary to increase the oxidation rate for Ti, Nb, W, Bi or the like during the thermal treatment.

In order to increase the oxidation rate, the presence of ions is important, which may be rapidly migrated in the glass during the thermal treatment and may oxidize Ti, Nb, W, Bi or the like by charge exchange. It is considered that H$^+$ is suitable as these ions.

In order to more easily migrate H$^+$, it is effective to introduce OH$^-$ into a glass structure and cause H$^+$ to hop starting from OH$^-$. Thereby, it is considered that the oxidation rate may be increased during the thermal treatment. Such a phenomenon is particularly noticeable in the phosphate-based glass. In brief, it is believed that the coloring is dramatically reduced when the glass is thermally treated by introducing H$^+$ and OH$^-$ as much as possible into the phosphate-based glass (i.e., by increasing a water content of the optical glass as large as possible).

βOH represented by the aforementioned equation (1) means absorbance due to a hydroxyl group. Therefore, it is possible to evaluate a concentration of water (and/or hydroxide ions, hereinafter simply referred to as "water") included in the glass, by evaluating βOH. That is, the glass having high βOH means that the concentration of water contained in the glass is high.

Thus, it may be said that H$^+$ derived from water in the glass is present in the optical glass according to the present exemplary embodiment having the βOH value of 0.1 mm$^{-1}$ or more. Hence, by the thermal treatment, H$^+$ may be rapidly migrated in the glass, perform a charge exchange, and efficiently oxidize each ion of Ti, Nb, W, Bi or the like. Therefore, in the optical glass of the present exemplary embodiment, it is possible to dramatically reduce the coloring by performing the thermal treatment in a short time, so that the glass subjected to the thermal treatment has excellent transmittance.

Further, in order to improve the transmittance after the thermal treatment, the lower limit of βOH is preferably 0.12 mm$^{-1}$ or more. It is more preferable that the lower limit value is increased in order of 0.15 mm$^{-1}$ or more, 0.18 mm$^{-1}$ or more, 0.20 mm$^{-1}$ or more, 0.23 mm$^{-1}$ or more, 0.25 mm$^{-1}$ or more, 0.28 mm$^{-1}$ or more, 0.30 mm$^{-1}$ or more, 0.33 mm$^{-1}$ or more, 0.35 mm$^{-1}$ or more, 0.37 mm$^{-1}$ or more, and 0.40 mm$^{-1}$ or more.

The upper limit of βOH varies depending on a glass type and a producing condition and is not particularly limited. However, as βOH is increased, the amount of matter volatilized from the molten glass tends to be increased. Therefore, in order to inhibit the glass component from being volatilized from the molten glass, βOH may be preferably 10 mm$^{-1}$ or less, more preferably 8 mm$^{-1}$ or less, much more preferably 6 mm$^{-1}$ or less, even more preferably 5 mm$^{-1}$ or less, still more preferably 4 mm$^{-1}$ or less, still even more preferably 3 mm$^{-1}$ or less, even much more preferably 2 mm$^{-1}$ or less, particularly preferably 1.0 mm$^{-1}$ or less, and most preferably 0.4 mm$^{-1}$ or less.

In order to inhibit the glass component from being volatilized from the molten glass, the upper limit of βOH may be determined by a relationship with the HR or the refractive index nd of the glass. For example, in order to inhibit the glass component from being volatilized from the molten glass, it is preferable to satisfy the following equation (A) or the following equation (B), and it is more preferable to satisfy both the equation (A) and the equation (B).

$$\beta OH < C_1 \times \ln(1/HR) + C_2 \quad (A)$$

(In the aforementioned equation (A), ln denotes a natural logarithm, constant $C_1$ is 0.4891 mm$^{-1}$, and constant $C_2$ is 2.48 mm$^{-1}$)

$$\beta OH < D_1 \times nd^{-3} - D_2 \times nd^{-2} + D_3 + D_3 \times nd^{-1} - D_4 \quad (B)$$

(In the aforementioned equation (B), constant $D_1$ is 181.39 mm$^{-1}$, constant $D_2$ is 325.75 mm$^{-1}$, constant $D_3$ is 194.85 mm$^{-1}$, and constant $D_4$ is 38.1 mm$^{-1}$)

Since infrared light penetrates even dark-colored glass, βOH may be evaluated regardless of the coloring of the glass (the presence of the reduction color). Also, since the thermal treatment is typically performed at a temperature lower than the softening point of the glass, the βOH value of the glass is not substantially changed before or after the thermal treatment and may be measured regardless of the time when the thermal treatment is performed. Thus, the βOH of the glass may be measured in any of the transparent glass that has undergone the thermal treatment (treatment for decreasing the coloring) and the dark-colored glass that has not undergone the thermal treatment. That is, the optical glass of the present exemplary embodiment is not particularly limited as long as βOH is 0.1 mm$^{-1}$ or more. The optical glass may be or may not be subjected to the thermal treatment (treatment for decreasing the reduction color).

In addition, the optical glass of the present exemplary embodiment is excellent in clarity. In the producing process (particularly the melting process) for the optical glass according to the present exemplary embodiment, it is considered that the amount of gas dissolved in the molten glass is increased because the treatment of adding water vapor to the melting atmosphere is carried out. As a result, the optical glass according to the present exemplary embodiment has the excellent clarity, so that it is possible to shorten a time required for a clarification process in the producing process, and thereby productivity is improved.

The refractive index nd of the optical glass according to the present exemplary embodiment is preferably 1.75 or more. A more preferable lower limit of the refractive index nd is 1.80, more preferably 1.85, and particularly preferably 1.90. Moreover, the upper limit of the refractive index nd is not limited as long as the glass is obtained, and may be about 2.5, for example. When the optical system is fabricated using the optical element made of the optical glass having the high refractive index, the compactness and the high functionality of the optical system are achieved. From such a point of view, the higher refractive index nd is preferable. However, an increase in refractive index shows a tendency to decrease the devitrification resistance of the glass. Therefore, the upper limit of the refractive index nd is preferably 2.4, and more preferably 2.3 to maintain the devitrification resistance.

The glass transition temperature of the optical glass according to the present exemplary embodiment is preferably 400 degrees Celsius or more, more preferably 500 degrees Celsius or more, much more preferably 550 degrees Celsius or more, even more preferably 570 degrees Celsius or more, and still even more preferably 600 degrees Celsius or more. If the glass transition temperature is within the aforementioned ranges, it is possible to rise the thermal treatment temperature for the glass in the oxidizing atmosphere and to efficiently decrease the coloring. In addition, it is possible to improve the processability of the glass, such as grinding or polishing.

A coloring degree (λ70) of the optical glass according to the present exemplary embodiment is preferably 600 nm or less, more preferably 540 nm or less, and much more preferably 500 nm or less. Further, the coloring degree (λ70) is a wavelength where the spectral transmittance of the optical glass (in a plate-like glass sample having the thickness of 10 mm±0.1 mm) is 70%.

Method for Producing the Optical Glass

The method for producing the optical glass according to the present exemplary embodiment is characterized in that the method comprises a melting process (i) that obtains a molten glass by heating and melting a glass raw material containing phosphorus and a glass raw material containing at least one component selected from the group consisting of $TiO_2$, $Nb_2O_5$, $WO_3$ and $Bi_2O_3$, in a melting vessel made of noble metal, a total content (HR) of the $TiO_2$, $Nb_2O_5$, $WO_3$ and $Bi_2O_3$ in the glass raw materials is 35 mol % or more, and at least one of a treatment (ia) of adding water vapor to a melting atmosphere and a treatment (ib) of bubbling water vapor in a melting product is carried out in the melting process.

Generally, if the melting operation is performed in the air atmosphere, in the case of melting the high-refractive-index glass that contains a large amount (HR of 35 mol % or more) of high refractive index components, such as $TiO_2$, $Nb_2O_5$, $WO_3$ or $Bi_2O_3$, using the melting vessel made of the noble metal, such as platinum, the oxygen included in the melting atmosphere reacts with the noble metal constituting the melting vessel, and the noble metal content in the obtained glass is increased.

As described above, if a large amount of noble metal is present in the glass, it causes deterioration in transmittance, solarization or the like. Thus, there has been conventionally proposed technique where the metal material constituting the melting vessel is ionized and is not dissolved in the molten glass, by adjusting the melting atmosphere.

For example, if the glass is melted with a reductive melting atmosphere, it is possible to inhibit the noble metal ions (the noble metal ions constituting the melting vessel) from being dissolved in the molten glass. However, if the molten glass is excessively reductive, the melting vessel may be alloyed by the reduced high-refractive-index components. Further, since the high-refractive-index components tend to be reduced under the non-oxidizing atmosphere even if the molten glass is not excessively reduced, the coloring degree (reduction color) of the glass is intensified. Even if the glass having a too strong reduction color is subjected to the thermal treatment in a post-process, the effect of decreasing the coloring remains slight.

Therefore, in order to solve the problem, the inventor has completed the present invention, based on the idea that the noble metal material forming the melting vessel is ionized and is melted without being dissolved in the molten glass, and a great effect of decreasing the coloring (reduction color) of the obtained glass after the thermal treatment is important.

The method for producing the optical glass according to the present exemplary embodiment performs at least one of the treatment (hereinafter simply referred to as "water vapor addition") of adding water vapor to the melting atmosphere and the treatment (hereinafter simply referred to as "water vapor bubbling") of bubbling water vapor in the melting product, in the melting process, thus significantly reducing the amount of the noble metal derived from the melting vessel in the melting process, dramatically improving transmittance after the thermal treatment, and thereby obtaining the optical glass that has little coloring and very good transmittance.

The method for producing the optical glass according to the present exemplary embodiment can effectively prevent the noble metal (e.g. platinum or the like) derived from the melting vessel or the like from being dissolved in the glass, thus further reducing the coloring derived from the noble metal ions in the obtained optical glass.

In the following description, a case where the melting vessel is made of platinum (Pt) is exemplified. The same applies to a case where the melting vessel made of a metal material such as noble metal other than the platinum is used.

The glass is usually melted in the air atmosphere, and oxygen contained in the air may react with the noble metal material such as platinum that is the material of the melting vessel. Particularly if the melting vessel is made of a platinum-based material, platinum dioxide ($PtO_2$) may be produced and dissolved into the melting product, or platinum ions ($Pt^{4+}$) from an interface between the melting product and the platinum-based material may be dissolved into the melting product. Since the noble metal ions dissolved in the molten glass absorb visible light, the coloring of the glass tends to be increased.

In order to reduce the coloring derived from these platinum ions, there may be employed a method of inhibiting the noble metal ions from being dissolved into the molten glass by adjusting the melting atmosphere to the reduction atmosphere. However, if the molten glass is excessively reductive, the melting vessel may be alloyed, and the strength and the durability of the melting vessel may be considerably lowered. Further, a method of substituting the melting atmosphere with inert gas may be used. However, this method is unsuitable for long-time melting, because the inert gas such as Ar is very expensive.

In contrast, the method for producing the optical glass according to the present exemplary embodiment performs at least one of the treatment of adding water vapor to the melting atmosphere and the treatment of bubbling water vapor in the melting product, in the melting process, thus reducing the partial pressure of oxygen in the melting atmosphere, and preventing the platinum material forming the melting vessel from being oxidized. Consequently, it is possible to effectively prevent platinum dioxide or platinum ions ($Pt^{4+}$) produced by reacting the oxygen in the melting atmosphere with the platinum material or the like from being dissolved into the melting product (glass), so that the dissolved amount of platinum (Pt) is further reduced in the obtained optical glass. As a result, the noble metal content of the obtained optical glass may be preferably less than 2 ppm.

It is considered that the supply of water vapor has the following effects, in addition to the effect of reducing the partial pressure of oxygen in the melting atmosphere. If $H_2O$ reaches the surface of platinum, it is considered that $H_2O$ is decomposed into $H^+$ and $OH^-$ by the catalytic effect of the platinum, some of $OH^-$ is bonded to the platinum ions, and the oxidation of the platinum is prevented. The aforementioned effects cannot be expected in the inert gas, such as argon or nitrogen. Actually, the content of the noble metal such as the platinum in the glass may be further reduced by supplying gas containing the water vapor rather than by supplying non-oxidizing gas in a dry state.

The optical glass produced by the producing method of the present exemplary embodiment has a very small content of noble metal such as Pt derived from the producing instrument such as the melting vessel. Thus, the coloring of the glass by the ultraviolet radiation, called the solarization, is little. Therefore, in the case of using such a glass for example as optical element, a change in the transmittance is little over time. Further, even if ultraviolet rays are radiated onto the optical element when the optical element is attached using an ultraviolet curable adhesive, the effect of preventing the transmittance from being decreased is also obtained.

Further, the method for producing the optical glass according to the present exemplary embodiment is able to increase a water content in the obtained optical glass and to dramatically improve the transmittance after the thermal treatment.

As described above, if one desires to reduce the coloring of the glass in a short time, it is considered that it is necessary to increase the oxidation rate of Ti, Nb, W, Bi or the like during the thermal treatment and it is preferable that $H^+$ and $OH^-$ as much as possible are present in the glass (the optical glass has a high water content).

However, the water content of the glass obtained by a typical producing method is very small. Generally, when the optical glass is produced from the glass raw material, a glass raw material component having the high water content, like hydroxides including orthophosphoric acid, aluminum hydroxide, calcium hydroxide or the like may be used as the glass raw material. However, water may transpire in the process of fusing the glass raw material to make the molten glass or in the molten glass state of the high temperature. In addition, even in the case of obtaining the glass by blending compounds into a batch raw material, rough melting this batch raw material to make a cullet, and then reblending the cullet and remelting it in the melting vessel, water initially contained in the batch raw materialis lost when the cullet is made, and water is also lost while the remelting process is performed in the melting vessel. Therefore, even if any method is used, the water content of the glass tends to be decreased.

Further, in the case of melting the glass under the non-oxidizing atmosphere so as to prevent the elution of the noble metal derived from the melting vessel, the water content of the glass tends to be further decreased. Generally, the glass is melted under the air atmosphere, but some water is contained in the air. However, if the melting atmosphere adopts the non-oxidizing atmosphere, it is usually necessary to substitute the non-oxidizing gas melting atmosphere such as the reduction gas or the inert gas that is dry gas. Thus, the water content of this glass is smaller than that of the glass melted under the air atmosphere.

Even if such a glass having a low water content is subjected to the thermal treatment under the oxidizing atmosphere, the effect of reducing the coloring remains slight.

In contrast, the method for producing the optical glass according to the present exemplary embodiment enables water to be supplied from an outside to the molten glass, thus replenishing water to compensate for a loss of the water that is transpired from the molten glass of the high temperature. Thus, this producing method can easily increase the water content of the optical glass, thus dramatically reducing the coloring after the thermal treatment. Preferably, the optical glass obtained by the producing method of the present exemplary embodiment has the βOH value of 0.1 $mm^{-1}$ or more.

Further, by the method for producing the optical glass according to the present exemplary embodiment, it is possible to dramatically improve the clarity.

Generally, glass that is homogeneous and has few bubbles is required in the production of the glass. In order to obtain the glass having few bubble as such, a clarification process is generally provided to release (defoam) the gas dissolved in the molten glass. The clarity of the glass depends on the amount of the dissolved gas in the molten glass. Such a dissolved gas amount is highly affected by the composition (particularly, the kind of the raw material) of the glass, a glass melting time, and a glass melting frequency.

The glass having poor clarity not only leaves bubbles in the obtained optical glass, but also increases a clarification time, thus leading to a reduction in productivity. Further, a clarification bath where the clarification process is performed is generally made of a noble metal material such as platinum or platinum alloy. Thus, as the time when the clarification process is performed is lengthened, a problem such as deterioration in transmittance due to the dissolving of the platinum ions into the melting product becomes serious. However, such a problem of the clarity is solved if it is possible to replenish the dissolved gas in the melting process.

As for the glass produced by the producing method of the present exemplary embodiment, it is considered that the amount of the dissolved gas in the molten glass is increased by performing at least one of the treatment of adding water vapor to the melting atmosphere and the treatment of bubbling water vapor in the melting product, in the melting process. In other words, it is believed that water (e.g., water vapor) that is actively introduced into the molten glass serves as the dissolved gas, thus improving the clarity of the glass.

By the method for producing the optical glass according to the present exemplary embodiment, the glass has excellent clarity, so that it is possible to efficiently produce the homogeneous glass having few bubbles in a short clarification time and thereby productivity is improved. Furthermore, since it is possible to shorten a time required for the clarification process, a contact time between the molten glass and the melting vessel can be reduced and thereby the dissolving of the noble metal ions into the melting product can be further decreased.

In the method for producing the optical glass according to the present exemplary embodiment, from the viewpoint of enhancing the effect of decreasing the coloring (reduction color) of the glass after the thermal treatment in the obtained glass while preventing the noble metal material from being dissolved in the molten glass by ionizing the noble metal material that forms the melting vessel, at least one of the treatment (hereinafter simply referred to as "water vapor addition") of adding water vapor to the melting atmosphere and the treatment (hereinafter simply referred to as "water vapor bubbling") of bubbling water vapor in the melting product, in the melting process, is carried out.

The method of adding water vapor to the melting atmosphere is not limited particularly. Examples of the method may include a method of inserting a connection pipe from an opening formed in the melting apparatus into a crucible, and feeding gas containing the water vapor through this pipe to a space in the crucible if necessary.

A flow rate of the gas containing the water vapor supplied to the space in the crucible is not limited particularly, and may be adjusted based on the result of measuring the $\beta OH$ of the experimentally produced glass. For example, in the case of supplying the water vapor in the roughly sealed melting vessel, if a relatively small amount of water vapor is supplied, the glass having the desired $\beta OH$ is obtained. Meanwhile, when the uncovered crucible is placed in the glass melting furnace and then the glass is melted, a volume in the glass melting furnace becomes larger than a volume in the crucible. In order to set the $\beta OH$ to a desired value, a large amount of water vapor is fed into the glass melting furnace. By feeding back the supply amount of the water vapor, namely, the flow rate of the gas to a next production, based on the experimental results, it is possible to produce the glass having the desired $\beta OH$. Further, hereinafter, the flow rate of gas, the flow rate of water vapor, the atmosphere adding flow rate, and the supply amount of the water vapor are values in terms of 25 degrees Celsius and 1 atm.

Furthermore, the bubbling method is not limited particularly, and a known method may be used. Examples of the bubbling method may include a method of sticking a pipe made of platinum or platinum alloy into the melting product of the melting vessel and blowing gas containing water vapor through the pipe into the melting product, a method of mounting a pipe made of the same material as the material of the melting vessel around a lower portion of the melting vessel and blowing gas containing water vapor into the melting product from the pipe, or the like.

The bubble diameter of the gas including the water vapor and blown into the melting product is preferably 0.01 to 100 mm, and more preferably 0.1 to 30 mm. It is considered that the aforementioned ranges can effectively increase the water content in the molten glass. If the bubble diameter is excessively small, a bubbling pipe inserted into the melting product may be undesirably clogged.

The flow rate of the gas including the water vapor and blown into the melting product is not limited particularly, and may be adjusted based on the result of measuring the $\beta OH$ of the experimentally produced glass. For example, if the $\beta OH$ of the experimentally produced glass is measured and the measured result is smaller than a desired value, the adjustment of increasing the flow rate of the gas is carried out. In contrast, if the measured result is smaller than a desired $\beta OH$ value, the adjustment of reducing the flow rate of the gas is carried out. As such, after the $\beta OH$ of the experimentally produced glass is obtained, the flow rate of the gas has only to be adjusted based on the measured result. As such, by feeding back the supply amount of the water vapor, namely, the flow rate of the gas to a next production based on the measured $\beta OH$ value of the experimentally produced glass, it is possible to produce a glass having the desired $\beta OH$.

The content of the water vapor in the gas containing the water vapor is preferably 3 volume % or more. The higher content of water vapor is preferred, and the content of the water vapor is preferably 10 volume % or more, more preferably 20 volume % or more, much more preferably 30 volume % or more, even more preferably 40 volume % or more, still more preferably 50 volume % or more, still even more preferably 60 volume % or more, even much more preferably 70 volume % or more, particularly preferably 80 volume % or more, and more particularly preferably 90 volume % or more. Particularly by setting the content of the water vapor to the aforementioned ranges, it is possible to enhance the effect of decreasing the coloring, reduce the content of the noble metal, and improve the clarity in the finally obtained glass.

Further, the gas containing the water vapor may use produced gas or commercially available gas, and may be gas mixed with other gases. Examples of other gases may include non-oxidizing gas or air. Among them, the non-oxidizing gas is preferred.

Further, in the method for producing the optical glass according to the present exemplary embodiment, it is preferable to supply both the water vapor and the non-oxidizing gas in either or both of the treatment (ia) of adding water vapor and the treatment (ib) of bubbling water vapor in the melting product.

According to the present exemplary embodiment, by supplying the water vapor to the melting atmosphere and/or the melting product, the βOH of the glass is increased and thereby the effect of decreasing the reduction color by the thermal treatment is enhanced. However, if a large amount of water vapor is continuously supplied, the volatilization of the glass component from the molten glass tends to be increased.

Therefore, according to the present exemplary embodiment, from the viewpoint of inhibiting the volatilization of the glass component from the molten glass, it is preferable to substitute some of the supplied water vapor with the non-oxidizing gas. Thereby, it is possible to suppress an excessive amount of water from being supplied, thus inhibiting the volatilization of the glass component. Moreover, the substituting gas utilizes the non-oxidizing gas, so that it is possible to maintain the effect of reducing the content of the noble metal.

Although the non-oxidizing gas is not limited particularly, it may include, for example, argon, nitrogen, carbon monoxide, carbon dioxide, hydrogen, helium, iodine or the like. The inert gas such as argon is preferable.

The supply amount of the non-oxidizing gas is not limited particularly. However, preferably when the volume of the supplying gas (the gas containing the water vapor) is 100 volume %, a ratio occupied by the non-oxidizing gas exceeds 0 volume % and is 97 volume % or less, and a more preferable upper limit thereof is 90 volume %. It is preferable that the upper limit is reduced in order of 80 volume %, 70 volume %, 60 volume %, 50 volume %, 40 volume %, 30 volume %, 20 volume % and 10 volume % so as to enhance the effect of decreasing the coloring by the thermal treatment. Meanwhile, it is preferable to increase a lower limit of a ratio occupied by the non-oxidizing gas in order of 10 volume %, 20 volume %, 30 volume %, 40 volume %, 50 volume %, 60 volume %, 70 volume %, 80 volume % and 90 volume %, so as to inhibit the volatilization of the glass component from the molten glass. Further, a ratio occupied by the water vapor in the gas containing the water vapor when the non-oxidizing gas is supplied is preferably 3 volume % or more and less than 100 volume %.

Further, in the method for producing the optical glass according to the present exemplary embodiment, it is possible to appropriately apply known methods to a glass raw material preparation method, a glass raw material heating method, a melting method, and a molding method for molten glass, except for matters described herein. Furthermore, known materials may be appropriately utilized for the glass raw material used in the method for producing the optical glass according to the present exemplary embodiment or the material forming the melting vessel.

In this regard, as the material forming the melting vessel or the like used to produce the glass, usually, a material (e.g., metal material or quartz material, etc.) having heat resistance and erosion resistance may be appropriately used in the temperature and atmosphere where the molten glass is melted.

However, depending on the composition of the glass that is to be produced, a molten product exhibiting considerable erosion may be produced or the molten glass may react with the material forming the melting vessel or the like, so that the melting vessel may be melted in some cases. Therefore, when the material forming the melting vessel is selected, it is preferable to appropriately select the material depending on the glass composition.

For example, in the case of the phosphate glass (glass containing at least one oxide selected from the group consisting of $P_2O_5$, $TiO_2$, $Nb_2O_5$, $WO_3$ and $Bi_2O_3$) containing the high refractive index component, the molten product exhibiting the considerable erosion is produced especially when the batch raw material is heated and melted. Since even the material of the molten product, such as platinum, having the excellent corrosion resistance tends to be eroded, the noble metal material such as platinum is eroded by the molten product and is dissolved into the melting product to be undesirably produced as foreign matter or increase the coloring of the glass.

Therefore, in the case of the phosphate glass containing the high refractive index component, a material of the melting vessel used to heat and melting product the batch raw material is preferably selected at the end of the melting process or apart from the clarification process. As the melting vessel or the like used to heat and melt the batch raw material, the vessel or instrument made of a refractory material, such as quartz, is preferable. The reason is as follows: although the refractory material such as the quartz is eroded by the molten product, it constitutes some of the glass composition when the refractory material is eroded and included in the melting product, with the result that it rarely causes the problem found in the noble metal material. At the end of the melting process or in the clarification process, there is little problem where the molten product erodes the noble metal material, so that it is preferable to use the vessel or instrument made of the noble metal, such as platinum or platinum alloy.

Meanwhile, a borate glass (glass containing at least one oxide selected from the group consisting of $TiO_2$, $Nb_2O_5$, $WO_3$ and $Bi_2O_3$) containing $B_2O_3$ and the high refractive index component rarely causes a problem where the molten product erodes the noble metal material as with the phosphate glass. Rather, in the case of the borate glass, the refractory vessel such as the quartz tends to be considerably eroded. Therefore, it is preferable to use, as the melting vessel or the like, the noble metal vessel or instrument made of platinum or platinum alloy that is difficult to be eroded in the glass producing process.

In the method for producing the optical glass according to the present exemplary embodiment, it is preferable to use the metal material as the material forming the melting vessel used to produce the glass. Here, it is preferable to use at least one selected from the noble metal and the noble metal alloy as the metal material. In the method for producing the optical glass according to the present exemplary embodiment, the treatment of adding water vapor to the melting atmosphere or the like is carried out, so that it is possible to reduce the oxygen partial pressure in the melting atmosphere without the excessive reducing atmosphere. Thus, the above-described noble metal or noble metal alloy is not eroded by the molten glass, and it is possible to maintain the molten glass in the oxidation-reduction state where the reduced high refractive index component is not alloyed with the material forming the melting vessel. Further, from the viewpoint of particularly excellent erosion resistance and heat resistance, it is preferable to use platinum, gold or the like as the noble metal and to use platinum alloy, gold alloy or the like as the noble metal alloy.

In the method for producing the optical glass according to the present exemplary embodiment, it is preferable that the heating melting process includes a clarification process of promoting the defoaming of the molten glass, and a homogenization process of homogenizing the glass by stirring while obtaining a viscosity suitable for molding by cooling the molten glass after the clarification, in addition to a melting process of making the molten glass by heating and melting the glass raw material.

A blended raw material (batch raw material) or a blended cullet obtained by weighing a raw material corresponding to the glass component and sufficiently performing a mixing operation may be used as the glass raw material so as to obtain the optical glass of desired characteristics.

When the cullet is used as the glass raw material, a cullet process (rough melt process) of making a cullet by roughly melting the batch raw material is carried out prior to the melting process (remelt process). Moreover, the refractive index of the cullet has been preferably measured in advance. If the measured value of the refractive index is equal to a desired value, the cullet is directly determined as a blended cullet. If the measured value of the refractive index deviates from the desired value, a cullet having a refractive index higher than the desired value is mixed with a cullet having a refractive index lower than the desired value to make a blended cullet.

Further, the cullet is made of glass, but needs not be a homogeneous glass. In addition, the cullet may include bubbles. Further, the cullet may include non-molten matter of the batch raw material. The cullet has the composition and optical properties (e.g., refractive index, Abbe's number, etc.) of the glass that is obtained by remelting the cullet and homogeneous and bubble free.

Even in the cullet making method (rough melt-remelt method) and the method (batch direct method) of melting the batch raw material in the direct melting process, in order to inhibit Ti, Nb, W and Bi from being excessively reduced, to inhibit the metal material from being ionized when the melting vessel is made of a metal material, and to ensure a water content in the glass, the glass heating temperature of the heating-melting process preferably maintains 800 to 1500 degrees Celsius, more preferably 1400 degrees Celsius or less, and more preferably 1300 degrees Celsius or less. In order to make it easy to dramatically reduce the coloring when the glass is thermally treated in the oxidizing atmosphere while additionally improving the clarity, it is preferable that the glass heating temperature during the heating-melting process is set to be the highest in the clarification process, that is, the glass is melted at the clarification temperature or below.

Further, if a time from the start to the end of the heating-melting process is lengthened, it leads to the reduction of the high refractive index component, the ionization of the metal material when the melting vessel is made of the metal material, and a decrease in the water content in the glass. Hence, it is preferable that the time from the start to the end of the heating-melting process is within 100 hours. Further, the time from the start to the end of the heating-melting process may be appropriately adjusted depending on the capacity of the melting vessel.

The method for producing the optical glass according to the present exemplary embodiment is more preferably carried out in the rough melt-remelt method.

That is, the method for producing the optical glass according to the present exemplary embodiment preferably has a rough melt process of obtaining the cullet by melting the blended material and a remelt process of obtaining glass by remelting the cullet, and is characterized in that at least one of the treatment (ia) of adding water vapor to the melting atmosphere and the treatment (ib) of bubbling water vapor in the melting product is carried out in at least one of the rough melt process and the remelt process.

In particular, when the glass is produced in the rough melt-remelt method, the melting temperature (rough melting temperature) of the batch raw material during the rough melting preferably ranges from 800 to 1400 degrees Celsius. Since the solubility of the dissolved gas is reduced with increasing temperature of the melting product, in order to further enhance the clarification effect, the temperature of the melting product in the rough melt process is preferably the melting temperature (remelting temperature) of the cullet in the remelt process or less, and is particularly preferably lower than the clarification temperature in the remelt process.

Further, the melting time of the rough melt process may be appropriately adjusted in consideration of the capacity of the crucible and the amount of inputting the batch raw material into the crucible. For example, the melting time may range from 0.1 to 100 hours and more preferably range from 0.1 to 20 hours.

Moreover, the melting temperature (remelting temperature) of the blended cullet in the remelt process preferably ranges from 800 to 1500 degrees Celsius. However, in order to further enhance the clarification effect, the remelting temperature is preferably lower than the clarification temperature. The melting time of the remelt process may be appropriately adjusted in consideration of the capacity of the crucible and the amount of inputting the blended cullet into the crucible. For example, the melting time during remelting may range from 0.1 to 100 hours and more preferably range from 2 to 20 hours.

Further, in the method for producing the optical glass according to the present exemplary embodiment, the atmosphere during melting is not limited particularly, but it is preferable to add water vapor to the melting atmosphere from the viewpoint of effectively increasing the water content in the molten glass.

First, the melting operation is initiated under the melting atmosphere other than the water vapor, such as the air atmosphere or the nitrogen atmosphere. The water vapor may be added to the melting atmosphere in the middle of the melting operation, and the melting atmosphere may be previously adjusted to the water vapor atmosphere.

When the treatment of adding water vapor to the melting atmosphere or the like is performed, the water-vapor partial pressure in the melting atmosphere is higher than the water-vapor partial pressure in the air, and more preferably is higher than oxygen partial pressure. Further, the upper limit of the water-vapor partial pressure is not limited particularly. For example, the entire melting atmosphere may be substituted with the water vapor.

Moreover, an increase in the water-vapor partial pressure in the melting atmosphere throughout the melting process can efficiently prevent the oxygen from reacting with the melting vessel made of the noble metal material such as platinum, and can reduce the amount of Pt or the like dissolved in the glass, thus effectively preventing the transmittance from being deteriorated (reduced). Further, the effect of improving the clarity is enhanced by maintaining the amount of the dissolved gas just before the clarification process.

Further, the melting process may also be accompanied by the stirring of the melting product, for the purpose of homogenizing the melting product. As the stirring method, a known method may be used. Examples of the stirring method may include a method of bubbling a gas into the melting product or a method of performing a stirring operation by a stirring rod.

In particular, the bubbling using the gas including the water vapor or the stirring of the melting product in the melting atmosphere to which the water vapor is added preferably leads to the homogenization of the melting product as well as an increase of the water content in the molten glass.

The method for producing the optical glass according to the present exemplary embodiment preferably includes a melting process (i) of obtaining molten glass by heating and melting the glass raw material containing phosphorus and the glass raw material containing at least one component of $TiO_2$, $Nb_2O_5$, $WO_3$ and $Bi_2O_3$ in the melting vessel, subsequently a process (ii) of discharging the molten glass to an outside of the melting vessel, and a process (iii) of molding the molten glass.

In the discharging process (ii), the molten glass that is clarified and homogenized is discharged from a glass discharge pipe mounted to a lower portion of the melting vessel. The temperature of the glass discharge pipe is within a temperature range where flowing molten glass is not devitrified, and is adjusted and maintained to have a viscosity suitable for the molding.

In the molding process (iii), any known method may be used as long as it is possible to mold the molten glass in the melting vessel into a predetermined shape. For example, the molten glass may be poured into a mold to have a block form, and the linear flow of a molten glass flowing down from the pipe may be cut every predetermined length (predetermined amount) to form a glass mass. Further, in the case of performing shaping that is higher in precision, in the post-process, the shape of each glass obtained through the molding process may be greatly varied. Further, the obtained glass may be dark-colored. The coloring may be reduced by performing the thermal treatment in the post-process.

In the method for producing the optical glass according to the present exemplary embodiment, at least one of the discharge process (ii) and the molding process (iii) is preferably carried out under the oxidizing atmosphere. Thereby, the reduction color of the glass can be efficiently decreased.

Typically, the reduction color derived from the high refractive index component may be decreased by thermally treating the glass under the oxidizing atmosphere. Particularly, the oxidation of Ti, Nb, W, Bi or the like tends to proceed rapidly as the temperature of the glass goes higher.

Therefore, it is considered that the glass having a temperature as high as possible, namely, the glass of the melting process (i) is exposed to the oxidizing atmosphere. However, when the melting vessel, the clarification bath or the like are made of the noble metal material or the like, the glass of the melting process (i) is in contact with the noble metal material. Thus, if the melting atmosphere is the oxidizing atmosphere, the noble metal material may undesirably react with the oxygen in the atmosphere and noble metal ions may be undesirably dissolved in the glass.

Meanwhile, it may be said that the glass in the discharge process (ii) and the molding process (iii) is lower in temperature than the glass in the melting process (i), but remains at a sufficiently high temperature as compared to the glass that is cooled after molding. Thus, even in these processes, the effect of reducing the coloring of the glass can be sufficiently expected by exposing the glass to the oxidizing atmosphere. Further, it is considered that the aforementioned problem rarely occurs, because the glass is not in contact with the noble metal material forming the melting vessel or the like in the discharge process (ii) and the molding process (iii).

Therefore, by performing at least one of the discharge process (ii) and the molding process (iii) in the oxidizing atmosphere, the reduction color can be efficiently decreased without concern that the noble metal material or the like will be dissolved into the molten glass.

Moreover, since the flow of the molten glass has a larger surface area exposed to the oxidizing atmosphere per unit volume as compared to a glass block in the mold, it is possible to more efficiently decrease the reduction color.

Further, since the reduction color of the glass is decreased in at least one of the discharge process (ii) and the molding process (iii), it is possible to easily perform an internal examination of the glass, for example, the presence of bubbles or precipitates, after the molding process (iii). Consequently, it is possible to carry out a detailed examination of the good glass in an early step, so that a yield is also improved.

Preferably, the method for producing the optical glass according to the present exemplary embodiment also has a thermal treatment process (iv) of thermally treating the molded glass. The thermal treatment is preferably carried out in the oxidizing atmosphere. It is possible to drastically reduce the coloring of the glass obtained as such. The glass subjected to the thermal treatment is little in color and thereby is high in transparency. That is, the transmittance is high in the visible region.

In the thermal treatment process (iv), the thermal treatment temperature and the thermal treatment time have only to be appropriately set to obtain desired optical properties. For example, it is preferable that the thermal treatment temperature is lower than the softening point of the glass and is equal to or higher than a temperature that is lower than the glass transition temperature Tg by 100 degrees Celsius (Tg—100 degrees Celsius).

Further, if the thermal treatment temperature is high when the coloring of the glass is reduced to a predetermined level, it is possible to shorten the thermal treatment time. In addition, an increase in oxygen partial pressure in the oxidizing atmosphere may also shorten the thermal treatment time. As such, the thermal treatment time varies depending on the thermal treatment temperature or the oxygen partial pressure in the oxidizing atmosphere, but is set such that the coloring of the glass reaches a desired level. It is preferable that the thermal treatment time is typically 0.1 to 100 hours.

The oxidizing atmosphere in the discharge process (ii), the molding process (iii) and the thermal treatment process (iv) is the air atmosphere or an atmosphere in which the oxygen partial pressure is higher than the air, and preferably the atmosphere in which the oxygen partial pressure is higher than the air.

A method for making the oxidizing atmosphere is not limited particularly, but may include a method of supplying oxidizing atmosphere gas as an example. The oxidizing atmosphere gas may be gas containing the oxygen, and the oxygen concentration may be approximately equal to or larger than that of the air. Examples of the oxidizing atmosphere gas may include the air, a gas obtained by adding oxygen to the air, and a gas substantially consisting of only oxygen.

About the Glass Composition

Hereinafter, unless otherwise specified, the content of glass components, the total content, and the content of additives are shown by mol % in terms of oxides.

The optical glass according to the present exemplary embodiment is a phosphate-based glass, and contains at least one oxide (hereinafter sometimes referred to as "high refractive index component") selected from the group consisting of $TiO_2$, $Nb_2O_5$, $WO_3$ and $Bi_2O_3$ as the glass components. Preferably, the total content of $TiO_2$, $Nb_2O_5$, $WO_3$ and $Bi_2O_3$ contained in the glass is 35% or more, preferably 37 mol % or more, more preferably 38 mol % or more, much more preferably 38.5 mol % or more, even more preferably 39 mol % or more, still more preferably 40 mol % or more, still even more preferably 43 mol % or more, and even still more preferably 50 mol % or more. If the total content of $TiO_2$, $Nb_2O_5$, $WO_3$ and $Bi_2O_3$ exceeds 85%, it shows a tendency to deteriorate the devitrification resistance. Thus, from the viewpoint of maintaining the devitrification resistance, the total content of $TiO_2$, $Nb_2O_5$, $WO_3$ and $Bi_2O_3$ is 85% or less, more preferably 80% or less, and even more preferably 75% or less.

The phosphate-based glass is also preferable from the viewpoint of increasing the contents of $TiO_2$, $Nb_2O_5$, $WO_3$ and $Bi_2O_3$ in the glass. In the phosphate-based glass, the migrating speed of $H^+$ is high during the heat treatment, it is possible to reduce the coloring by the heat treatment in a short timer as compared to other composition systems.

Examples of the glass may include a glass having the content of $P_2O_5$ greater than that of $SiO_2$ and also greater than that of $B_2O_3$, and a glass having the content of $P_2O_5$ greater than a total content of $SiO_2$ and $B_2O_3$, by mol %.

The present exemplary embodiment may be applied to a glass composition containing a known composition where the contents of $TiO_2$, $Nb_2O_5$, $WO_3$ and $Bi_2O_3$ are within the aforementioned ranges, in addition to the composition exemplified by the example.

Next, a preferred glass composition according to the present exemplary embodiment will be described.

$P_2O_5$ is a glass network forming component and has the function of maintaining the thermal stability of the glass. If the content of $P_2O_5$ is less than 7%, it shows the tendency to lower the thermal stability. Thus, the content of $P_2O_5$ is preferably 7% or more. If the content of $P_2O_5$ is larger than 40%, the refractive index decreases. Therefore, it is preferable that the content of $P_2O_5$ ranges from 7 to 40%. A preferable lower limit of the content of $P_2O_5$ is 10%, a more preferable lower limit thereof is 12%, a much more preferable lower limit thereof is 15%, and a even more preferable lower limit thereof is 18%. A preferable upper limit of the content of $P_2O_5$ is 35%, a more preferable upper limit thereof is 33%, a much more preferable upper limit thereof is 30%, and an even more preferable upper limit thereof is 28%.

$SiO_2$ is poorly dissolved into the glass having the $P_2O_5$-based composition. Thus, if a large amount of $SiO_2$ is introduced, non-dissolved $SiO_2$ is present and thereby the homogeneity of the glass tends to be deteriorated. If the melting temperature is increased so that non-dissolved $SiO_2$ is not present, the noble metal content increases, and the coloring of the glass also increases. Therefore, the content of $SiO_2$ is less than the content M of $P_2O_5$. In the relationship between the content of $SiO_2$ and the content M (content [%] of $P_2O_5$), a preferable content range of $SiO_2$ is 0% to 0.8×M [%], a more preferable range is 0% to 0.5×M [%], a much more preferable range is 0% to 0.3×M [%], and an even more preferable range is 0% to 0.15×M [%].

A small amount of $B_2O_3$ serves to improve the devitrification resistance. In the relationship between the content of $B_2O_3$ and the content M (content [%] of $P_2O_5$), a range of a $B_2O_3$ content is 0% or more and is less than M [%], a more preferable range is 0% to 0.9×M [%], a much more preferable range is 0% to 0.7×M [%], an even more preferable range is 0% to 0.6×M [%], a still more preferable range is 0% to 0.5×M [%], an still even more preferable range is 0% to 0.4×M [%], and a even much more preferable range is 0% to 0.35×M [%].

$TiO_2$, $Nb_2O_5$, $WO_3$ and $Bi_2O_3$ are components that serve to increase the refractive index, enhance dispersion, and improve chemical durability. However, if the content of each of $TiO_2$, $Nb_2O_5$, $WO_3$ and $Bi_2O_3$ is increased, it shows the tendency to deteriorate the devitrification resistance.

From the viewpoint of maintaining the devitrification resistance, a preferable upper limit of the content of $TiO_2$ is 40%, a more preferable upper limit thereof is 35%, an even more preferable upper limit thereof is 33%, and a still more preferable upper limit thereof is 30%. In order to obtain the effect of introducing $TiO_2$, a preferable lower limit of the content of $TiO_2$ is 1%, and a more preferable lower limit thereof is 3%. The content of $TiO_2$ may also be 0%.

From the viewpoint of maintaining the devitrification resistance, a preferable upper limit of the content of $Nb_2O_5$ is 45%, a more preferable upper limit thereof is 40%, and an even more preferable upper limit thereof is 35%. In order to obtain the effect of introducing $Nb_2O_5$, a preferable lower limit of the content of $Nb_2O_5$ is 5%, a more preferable lower limit thereof is 8%, and an even more preferable lower limit thereof is 11%. The content of $Nb_2O_5$ may also be 0%.

The content of $WO_3$ preferably ranges from 0 to 30%. From the viewpoint of obtaining the effect of introducing $WO_3$, a preferable lower limit of the content of $WO_3$ is 1%, a more preferable lower limit thereof is 3%, and an even more preferable lower limit thereof is 5%. Meanwhile, in order to maintain the devitrification resistance, a preferable upper limit of the content of $WO_3$ is 27%, a more preferable upper limit thereof is 24%, an even more preferable upper limit thereof is 20%, and a still more preferable upper limit thereof is 18%. The content of $WO_3$ may also be 0%.

The content of $Bi_2O_3$ preferably ranges from 0 to 35%. In order to obtain the effect of introducing $Bi_2O_3$, a preferable lower limit of the content of $Bi_2O_3$ is 1%, a more preferable lower limit thereof is 3%, and an even more preferable lower limit thereof is 5%. Meanwhile, from the viewpoint of maintaining the devitrification resistance, a preferable upper limit of the content of $Bi_2O_3$ is 30%, a more preferable upper limit thereof is 28%, and an even more preferable upper limit thereof is 24%. The content of $Bi_2O_3$ may also be 0%.

A range of the total content of $Bi_2O_3$ and $B_2O_3$ is preferably less than 50%, more preferably less than 45%, and much more preferably is 40%.

Divalent metal components such as BaO, SrO, CaO, MgO or ZnO serves to improve the meltability of the glass, in addition to reducing the coloring of the glass. Further, a proper amount of divalent metal components serves to improve the devitrification resistance. However, if an excessive amount of divalent metal components is contained, this leads to a reduction in refractive index and deterioration in devitrification resistance. Hence, the total content of BaO, SrO, CaO, MgO and ZnO is preferably in the range of 0 to 40%, and more preferably in the range of 0 to 32%. A preferable upper limit of the total content of BaO, SrO, CaO, MgO and ZnO is 30%, a more preferable upper limit thereof is 27%, and an even more preferable upper limit thereof is 25%. A preferable lower limit of the total content of BaO, SrO, CaO, MgO and ZnO is 0.1%, a more preferable lower limit thereof is 0.5%, and an even more preferable lower limit is 1%.

Among these divalent metal components, BaO is a component that is effective to maintain the high refractive index. Thus, the content of BaO is preferably in the range of 0 to 40% and more preferably in the range of 0 to 32%. A preferable upper limit of the content of BaO is 30%, a more preferable upper limit thereof is 27%, and an even more preferable upper limit thereof is 25%. A preferable lower limit of the content of BaO is 0.1%, a more preferable lower limit thereof is 0.5%, and an even more preferable lower limit thereof is 1%. The content of BaO may also be 0%.

Alkali metal oxides such as $Li_2O$, $Na_2O$ or $K_2O$ serve to improve the meltability of the glass, in addition to reducing the coloring of the glass. Further, they serve to lower the glass transition temperature and the softening temperature, thus lowering the heating treatment temperature for the glass. However, an excessive amount of alkali metal oxides leads to a reduction in refractive index and deterioration in devitrification resistance. Thus, the total content of $Li_2O$, $Na_2O$ and $K_2O$ is preferably in the range of 0 to 40%, more preferably in the range of 0 to 35%, much more preferably in the range of 0 to 32%, and even more preferably in the range of 0 to 30%. The content of each of $Li_2O$, $Na_2O$ and $K_2O$ may also be 0%. Particularly in the case of using $Li_2O$ as the alkali metal oxide, from the viewpoint of obtaining the high refractive index glass, its content in the produced glass is preferably more than 0% and less than 10%, more preferably more than 0% and equal to or less than 9%, and particularly preferably more than 0% and equal to or less than 8%.

A small amount of $Al_2O_3$ serves to improve the devitrification resistance, whereas an excessive amount of $Al_2O_3$ lowers the refractive index. Therefore, the content of $Al_2O_3$ is preferably in the range of 0 to 12%, more preferably in the range of 0 to 7%, and much more preferably in the range of 0 to 3%.

$ZrO_2$ serves to increase the refractive index, in addition to improving the devitrification resistance if a small amount of $ZrO_2$ is contained. However, an excessive amount of $ZrO_2$ shows the tendency to deteriorate the devitrification resistance or the meltability. Accordingly, the content of $ZrO_2$ is preferably in the range of 0 to 16%, more preferably in the range of 0 to 12%, much more preferably in the range of 0 to 7%, and even much more preferably in the range of 0 to 3%.

$GeO_2$ serves to increase the refractive index while maintaining the devitrification resistance. Further, although $GeO_2$ has the function of increasing the refractive index, it does not increase the coloring of the glass unlike $TiO_2$, $Nb_2O_5$, $WO_3$ and $Bi_2O_3$. However, since $GeO_2$ is a very expensive component in comparison with other components, it is desirable to decrease the content of $GeO_2$ so as to reduce the production cost of the glass. Thus, in order to widely distribute a high refractive index glass product, it is required to provide a high refractive index glass that has excellent transmittance while reducing the content of $GeO_2$. According to the present exemplary embodiment, it is possible to provide the high refractive index glass having excellent transmittance without the necessity of using a large amount of $GeO_2$ by setting the total content of $TiO_2$, $Nb_2O_5$, $WO_3$ and $Bi_2O_3$ to 20% or more.

From this point of view, the content of $GeO_2$ is preferably in the range of 0 to 10%, more preferably in the range of 0 to 5%, much more preferably in the range of 0 to 3%, even more preferably in the range of 0 to 2%, still more preferably in the range of 0 to 1%, and still even more preferably in the range of 0 to 0.5%. The glass may contain no $GeO_2$. Further, an effective amount of $GeO_2$ may be preferably used unless a production cost is considered.

$TeO_2$ serves to increase the refractive index while maintaining the devitrification resistance. However, in order to alleviate a load on environment, the content of $TeO_2$ is preferably in the range of 0 to 10%, more preferably in the range of 0 to 5%, much more preferably in the range of 0 to 3%, even more preferably in the range of 0 to 2%, still more preferably in the range of 0 to 1%, and even still more preferably in the range of 0 to 0.5%. The glass may contain no $TeO_2$.

$Sb_2O_3$ has oxidizing effect and serves to inhibit the reduction of $TiO_2$, $Nb_2O_5$, $WO_3$ and $Bi_2O_3$. However, $Sb_2O_3$ itself has absorption in the visible region, oxidizes the melting vessel made of the noble metal due to its oxidizing effect, thus causing the noble metal ions to be dissolved into the molten glass. Therefore, the preferable range of the content of $Sb_2O_3$ is 0 ppm or more and less than 1000 ppm. From this point of view, the upper limit of the content of $Sb_2O_3$ is more preferable as it is reduced in order of 900 ppm, 800 ppm, 700 ppm, 600 ppm, 500 ppm, 400 ppm, 300 ppm, 200 ppm and 100 ppm. $Sb_2O_3$ may not be contained.

If a large amount of components other than the aforementioned components is contained, the devitrification resistance of the glass is deteriorated and there is a tendency that liquidus temperature rises. Therefore, the glass melting temperature has to be increased, and thus the erosion of the melting vessel made of the noble metal increases, and the amount of the noble metal dissolved into the glass increases. Further, the reduction color of $TiO_2$, $Nb_2O_5$, $WO_3$ and $Bi_2O_3$ also increases.

In order to inhibit the amount of the noble metal from being increased and suppress the coloring of the glass, the total content of $P_2O_5$, $SiO_2$, $B_2O_3$, $TiO_2$, $Nb_2O_5$, $WO_3$, $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ is preferably 90% or more, more preferably 92% or more, much more preferably 95% or more, even more preferably 96% or more, still more preferably 97% or more, still even more preferably 98% or more, and even much more preferably is more than 99%. Further, the total content may be 100%.

It is possible to contain a small amount of $Ta_2O_5$, $Y_2O_3$, $La_2O_3$, $Gd_2O_3$, $Yb_2O_3$, $In_2O_3$, $Ga_2O_3$, $SnO_2$, $CeO_2$, F or the like. The total content of $Ta_2O_5$, $Y_2O_3$, $La_2O_3$, $Gd_2O_3$, $Yb_2O_3$, $In_2O_3$, $Ga_2O_3$ and F is preferably in the range of 0 to 10%, more preferably in the range of 0 to 7%, much more preferably in the range of 0 to 5%, even much more preferably in the range of 0 to 3%, still much more preferably in the range of 0 to 1%, and even still more preferably in the range of 0 to 0.5%.

Since F increases the volatility of the molten glass, a large amount of F is not required for the purpose of obtaining a homogeneous glass and a glass having stable optical properties. The content of F is preferably in the range of 0 to 3%, more preferably in the range of 0 to 1%, and much more preferably in the range of 0 to 0.5%. It is even much more preferable that F is not substantially contained.

In order to reduce a load on environment, it is preferable that Pb, As, Cd, U, Th and Tl are not substantially contained.

In order to decrease the coloring of the glass, it is preferable that components and additives having absorption in the visible region, such as Cu, Cr, Mn, Fe, Co, Ni, V, Mo, Nd, Eu, Er, Tb, Ho or Pr are not substantially contained.

However, the optical glass according to the present exemplary embodiment is not intended to exclude the inclusion of inevitable impurities.

Further, the term "does not substantially contain" may mean that the content is less than 0.5 mol %. Since it is preferable that the glass has no components or additives that are not substantially contained, the content thereof is preferably less than 0.1 mol %, more preferably less than 0.08 mol %, much more preferably less than 0.05 mol %, even more preferably less than 0.01 mol %, and still more preferably less than 0.005 mol %.

As the glass raw material, it is possible to use known glass raw material, such as oxide, phosphoric acid, phosphate (polyphosphate, metaphosphate, pyrophosphate, etc.), boric acid, anhydrous boric acid, carbonate, nitrate, sulfate, hydroxide or the like depending on the glass component.

Production of Optical Elements

In order to make an optical element using the optical glass, a known method may be applied. For example, a molten glass is molded to prepare a glass material for press molding. Next, this glass material is reheated and press-molded to produce an optical element blank. Further, a process including a process of polishing the optical element blank is performed to produce the optical element.

Alternatively, the molten glass is molded to prepare a glass material for press molding and the glass material is heated and subjected to precision press molding to produce an optical element.

In each process, the molten glass may be molded to produce a glass molded body, and then the glass molded body may be processed to produce a glass material for press molding.

Alternatively, the molten glass may be molded to produce a glass molded body, and then the molded body may be processed to produce an optical element.

An optical functional face of the produced optical element may be coated with an anti-reflection film, a total reflection film or the like depending on an intended purpose.

Examples of the optical element may include various types of lenses, such as a spherical lens, an aspherical lens, a macro lens or a lens array, a prism, a diffraction grating and the like.

Having described a specific embodiment of the present invention, it should be understood that the present invention is not limited to the specific embodiment and that various changes and modifications may be made in the invention without departing from the spirit and scope thereof.

Since the optical glass according to the present exemplary embodiment is preferred as the material for an optical element, it is preferably an amorphous glass. Examples of the method for producing an optical element made of the glass include a method of heating, softening and molding a glass material. A crystallized glass having a crystalloid dispersed in a glassy substance is not suitable for the aforementioned molding method. Further, the crystalloid in the crystallized glass may scatter light, thus deteriorating performance as the optical element. The amorphous glass has no such a problem.

Although the method of fusing a raw material mainly using a crucible has been described in the present exemplary embodiment, as an example of the method for producing the optical glass, a quartz tube that is open at both ends thereof may be used as the melting vessel.

Specifically, the tube made of quartz or the like is obliquely fixed in the glass melting furnace. An opening is formed in the lower portion of the glass melting furnace at a position under an opening end that is at a lower position of the tube. The raw material (batch raw material or cullet) is introduced into the tube from the upper opening end, and is melted (or fused) in the tube to produce a melting product. The melting product flows slowly in the tube, and is sequentially discharged from the lower opening end.

For example, in the case of using the tube or the like in the rough melt process, an effluent passes through an opening in a bottom, and sequentially drops to water in a water bath that is previously disposed under the opening in the lower portion of the glass melting furnace, thus forming a cullet.

Although the above-described method melts the raw material using the tube made of quartz or the like, the crucible made of quartz or the like may be used in place of the tube. First, the raw material is put into the crucible made of quartz or the like, and then is heated and melted to form a melting product. Subsequently, the melting product may be cast in the water or may flow onto the cooled heat resistant plate, thus producing a cull et.

EXAMPLES

Hereinafter, the present invention is described in more detail with reference to examples, but the present invention is not limited to these examples.

Example 1

[Preparation of Batch Raw Material]

First, upon producing an optical glass with desired properties, phosphoric acid, barium metaphosphate, titanium oxide, niobium oxide, tungsten oxide, bismuth oxide, boric acid, barium carbonate, sodium carbonate, potassium carbonate and silicon oxide were respectively prepared as the raw material of the glass. Next, batch raw materials I to VI were produced by appropriately selecting, weighing and sufficiently mixing the raw materials such that the composition of the finally obtained optical glass has oxide compositions I to VI shown in Table 1.

TABLE 1

| glass component | oxide composition (mol %) | | | | | |
|---|---|---|---|---|---|---|
| | I | II | III | IV | V | VI |
| $P_2O_5$ | 23.6 | 24.6 | 25.7 | 30.4 | 22.6 | 21.5 |
| $TiO_2$ | 11.8 | 19.3 | 26.7 | 21.2 | 18.2 | 21.2 |
| $Nb_2O_5$ | 29.3 | 28.2 | 26.3 | 20.6 | 16.5 | 19.3 |
| $WO_3$ | — | — | — | 9.0 | 14.5 | 9.4 |
| $Bi_2O_3$ | — | — | — | 10.1 | 20.9 | 24.5 |
| $B_2O_3$ | 6.2 | 5.0 | 3.8 | 1.9 | 2.8 | 2.4 |
| BaO | 22.1 | 12.1 | 1.5 | 2.1 | 2.8 | 1.7 |
| $Na_2O$ | 7.0 | 5.0 | 10.0 | 3.0 | — | — |
| $K_2O$ | — | 5.8 | 6.0 | 1.7 | — | — |
| $SiO_2$ | — | — | — | — | 1.6 | — |
| HR | 41.2 | 47.5 | 53.0 | 60.9 | 70.2 | 74.4 |

[Production of Cullet and Blended Cullet (Rough Melt Process)]

The blended batch raw materials I to VI were used as the glass raw material of each optical glass. The glass raw material was put into a quartz crucible and melted in an air atmosphere at 900 to 1350 degrees Celsius, thus obtaining a melting product. The melting product obtained in this way was dropped into water, thus obtaining a cullet.

The cullet taken out from water was dried, some of the cullet was sampled for measuring the refractive index and was put into a platinum crucible to be melted. After a resulting glass molten liquid was clarified and homogenized, this was injected into the mold and then molded. This was maintained around the glass transition temperature and then was cooled at a cooling rate of −30 degrees Celsius/hr. The refractive index nd of the sample for measuring the refractive index obtained as such was measured by a refractive-index measuring method according to Japanese Optical Glass Industrial Standard.

Subsequently, the cullet was blended to have a desired refractive index according to the measured refractive index nd, thus obtaining the blended cullet for producing an optical glass.

[Production of Optical Glass (Remelt Process)]

Next, the blended cullet was put into the platinum crucible (melting vessel), and the blended cullet in the platinum crucible was heated and melted in the range of 800 to 1350 degrees Celsius, thus producing a molten glass (melting process).

Thereafter, the temperature of the crucible was raised up to a clarification temperature (range of 900 to 1450 degrees Celsius) and clarification was performed (clarification process). Subsequently, the temperature of the crucible was lowered to a homogenization temperature, and the stirring operation was performed by a stirring instrument to achieve the homogenization (homogenization process).

Further, a volume (volume of a space in the refractory furnace accommodating the crucible) in the melting furnace, and a residence time (a time required to discharge the molten glass from the melting vessel, after the cullet is put into the platinum melting vessel) of the melting product in the melting furnace are shown in Table 2.

Moreover, in the course of the melting process, the clarification process, and the homogenization process, at least one of the treatment (ia) of adding water vapor to the melting atmosphere and the treatment (ib) of bubbling water vapor in the melting product was carried out.

Specifically, the platinum pipe from the outside of the melting furnace was inserted into the platinum crucible disposed in the furnace, and water vapor ($H_2O$ 100 volume %) was supplied into the space in the platinum crucible, through the platinum pipe. As such, the addition of the water vapor to the melting atmosphere was performed by adding the water vapor to the air. The flow rate of the supplied water vapor is shown in Table 2.

If necessary, the water vapor ($H_2O$ 100 volume %) in the melting product was bubbled from a pipe installed at the lower portion of the crucible. As such, the bubbling the water vapor in the melting product was carried out by bubbling water vapor against the melting product in the air atmosphere or the melting product in the melting atmosphere where the water vapor is added to the air. The flow rate of the supplied water vapor is shown in Table 2.

Further, the flow rate of the water vapor shown in Table 2 is a value in terms of a flow rate at room temperature and atmospheric pressure, and the unit of the flow rate is liters/min.

When water vapor is not supplied into the crucible, a platinum lid is not closed, and the melting vessel is open. In this state, all of the melting process, the clarification process and the homogenization process were carried out under an air atmosphere.

TABLE 2

| sample No. | oxide composition | volume liter | residence time hour | water vapor atmospheric adding flow rate l/min | water vapor bubbling flow rate l/min |
|---|---|---|---|---|---|
| 11 | I | 40 | 5.5 | 250 | — |
| 12 | | 40 | 5.5 | 300 | — |
| 13 | | 40 | 5.5 | 320 | — |

TABLE 2-continued

| sample No. | oxide composition | volume liter | residence time hour | water vapor atmospheric adding flow rate l/min | water vapor bubbling flow rate l/min |
|---|---|---|---|---|---|
| 21 | II | 40 | 5.2 | 10 | — |
| 22 | | 40 | 5.2 | 250 | — |
| 23 | | 40 | 5.2 | 300 | — |
| 24 | | 40 | 5.2 | 320 | — |
| 31 | III | 40 | 4.8 | 15 | — |
| 32 | | 40 | 4.8 | 40 | — |
| 33 | | 40 | 4.8 | 320 | — |
| 34 | | 40 | 4.8 | 320 | 4 |
| 41 | IV | 40 | 6.5 | 15 | — |
| 42 | | 40 | 6.5 | 40 | — |
| 43 | | 40 | 6.5 | 300 | — |
| 44 | | 40 | 6.5 | 320 | — |
| 51 | V | 40 | 7.3 | 2 | — |
| 52 | | 6 | 5.0 | 34 | — |
| 61 | VI | 40 | 7.3 | 2 | — |
| 62 | | 6 | 5.0 | 12 | — |
| 63 | | 6 | 5.0 | 34 | — |

The molten glass homogenized in this way was discharged, in the air atmosphere, from the glass discharge pipe made of platinum and mounted to the lower portion of the crucible (discharge process), and was poured into the mold located under the discharge pipe to mold a long glass block (width 150 mm×thickness 10 mm) (molding process).

Thereafter, the temperature of the glass block was raised, in the air atmosphere, at the rate of +100 degrees Celsius/hr. The glass block was maintained around each glass transition temperature for 1.5 to 8 hours and cooled at the rate of −10 degrees Celsius/hr (annealing process). Thereby, an optical glass having no deformation was obtained.

[Evaluation of Optical Glass]

Various physical properties of the obtained optical glass samples (samples 11 to 63) were measured and evaluated as follows.

[1] Glass Composition

A proper amount of optical glass sample was taken and treated with acid and alkali. The component contents of the sample were measured using inductively coupled plasma mass spectrometry (ICP-MS method) or ion chromatography. It was checked that the component contents match the oxide compositions I to VI.

[2] Refractive Index nd, Abbe's Number vd and Glass Transition Temperature Tg

When the optical glass sample was produced, the molten glass subjected to the homogenization process was injected into the mold to be molded, was maintained around the glass transition temperature, and then was cooled at the cooling rate of −10 degrees Celsius/hr, thus producing a sample for measuring. The refractive indexes nd, ng, nF, nc of the obtained sample for measuring were measured by the refractive-index measuring method according to Japanese Optical Glass Industrial Standards. Further, Abbe's number vd was calculated based on the measured values of these refractive indexes.

Next, the optical glass sample was processed to produce a cylindrical sample for measuring (diameter of 5 mm, height of 20 mm). For the obtained sample for measuring, the glass transition temperature Tg was measured under the condition of heating rate +10 degrees Celsius/min using a thermomechanical analyzing apparatus (TMA).

Since the characteristic values depend on the glass composition, it is noted that the optical glass sample using the same batch raw material as the glass raw material substantially has the same value. The results are shown in Table 3.

TABLE 3

| | oxide composition | | | | | |
|---|---|---|---|---|---|---|
| | I | II | III | IV | V | VI |
| refractive index nd | 1.92 | 1.93 | 1.95 | 2.02 | 2.11 | 2.16 |
| Abbe's number νd | 20.9 | 19.2 | 18.0 | 17.8 | 17.0 | 16.2 |
| glass transition point Tg (° C.) | 666 | 652 | 637 | 601 | 561 | 558 |

[3] βOH

By processing the optical glass sample, a plate-like glass sample was prepared, which was optically polished so that both surfaces thereof were parallel to each other or flat and was 1 mm in thickness. Light was incident in a direction perpendicular to a polished surface of the plate-like glass sample, so that external transmittance A at the wavelength of 2500 nm and external transmittance B at the wavelength 2900 nm were measured respectively using the spectrophotometer, and βOH was calculated by the following equation (1).

$$\beta OH = -[\ln(B/A)]/t \quad (1)$$

In the above-described equation (1), ln denotes a natural logarithm, and the thickness t corresponds to an interval between two flat surfaces. Further, the external transmittance includes a reflective loss at the glass sample surface, and it is the ratio of the intensity of transmitted light to the intensity of incident light on the glass sample (transmitted light intensity/incident light intensity). The higher βOH value means that more water is contained in the glass. The results are shown in Table 6.

[4] T450(H)

The optical glass sample was heated, in the air atmosphere, at the rate of +100 degrees Celsius/hr, was maintained at a predetermined holding temperature for 100 hours, and was cooled at the rate of −30 degrees Celsius/hr, so that the sample was thermally treated. Since the holding temperature varied depending on the composition, it was set to temperatures shown in Table 4 depending on the oxide composition of the each optical glass sample.

TABLE 4

| | oxide composition | | | | | |
|---|---|---|---|---|---|---|
| | I | II | III | IV | V | VI |
| holding temperature (° C.) | 650 | 630 | 630 | 570 | 550 | 530 |

The optical glass sample subjected to the thermal treatment was processed, thus preparing the plate-like glass sample that was optically polished so that both surfaces were parallel to each other or flat and was 10 mm in thickness. For the plate-like glass sample obtained in this way, external transmittance T450(H) at 450 nm was measured using the spectrophotometer. The higher value of T450(H) means that the transmittance is excellent and the coloring of the glass is decreased. The results are shown in Table 6.

[5] Pt Content

A proper amount of optical glass sample was taken and was subjected to alkali fusion. After treatment of separating Pt was performed, the amount of Pt in the glass was measured by the ICP-MS method. The results are shown in Table 6.

[6] Coloring Degree λ70

First, the optical glass sample was thermally treated under the same condition as T450(H).

The optical glass sample subjected to the thermal treatment was processed, thus preparing the plate-like glass sample that was optically polished so that both surfaces were parallel to each other or flat and was 10 mm±0.1 mm in thickness. Light was incident in the direction perpendicular to the polished surface of the plate-like glass sample, so that spectral transmittance including a surface reflective loss was measured in a wavelength ranging from 280 nm to 700 nm using the spectrophotometer, and the wavelength at which the spectral transmittance (external transmittance) was 70% was defined as the coloring degree λ70. A lower value of λ70 means that the coloring of the glass is little. The results are shown in Table 6.

[7] T450(L)

When the optical glass sample was produced, 0.5 to 0.7 cc of the molten glass subjected to the homogenization process was taken, and then poured into a cavity of a floating molding mold (mold configured such that the cavity for accommodating the molten glass is formed with a porous body and a gas is emitted from the surface of the cavity through the porous body). The gas was emitted from the cavity, and an upward wind pressure was applied to the molten glass mass on the cavity. Thereby, the glass mass was molded in the floating state.

Thereafter, the glass mass was heated at the rate of +100 degrees Celsius/hr, was maintained at a predetermined holding temperature and holding time, and was cooled at the rate of −30 degrees Celsius/hr, thus obtaining a spherical optical glass sample after the thermal treatment. Further, since the holding temperature and the holding time varied depending on the composition, they were set to the temperatures and times shown in Table 5 depending on the oxide composition of each optical glass sample.

TABLE 5

| | oxide composition | | | | | |
|---|---|---|---|---|---|---|
| | I | II | III | IV | V | VI |
| holding temperature (° C.) | 650 | 630 | 600 | 600 | 550 | 500 |
| holding time (h) | 4 | 4 | 1 | 5 | 5 | 6 |

The obtained spherical optical glass sample was processed, thus preparing the plate-like glass sample that was optically polished so that both surfaces were parallel to each other or flat and was 5 mm in thickness. For the plate-like glass sample obtained in this way, external transmittance T450(H) at 450 nm was measured using the spectrophotometer. The higher value of T450(H) means that the transmittance is excellent and the coloring of the glass is decreased even by a short-time thermal treatment.

[8] Defoaming

When the optical glass sample was produced, 40 cc of the molten glass (glass molten liquid) was taken before the clarification process was initiated, and was clarified, in the air, in another platinum crucible for a predetermined period of time. The glass molten liquid was cooled in the platinum crucible and then solidified. In this process, the coloring was reduced to allow the number of the bubbles contained in the glass to be counted. Next, the solidified glass was taken out from the platinum crucible.

For the sample for measuring obtained as such, the interior of the glass was magnified and observed (100 times) using an optical microscope (magnification of 20 to 100), and then the number of the bubbles contained in the glass was counted. The same observation was performed on each sample for measuring that has a different clarification time. A clarification time of the sample for measuring when 100 bubbles or less per kilogram remain in the glass was evaluated as a defoaming time. The shorter the defoaming time is, the more excellent the clarity is. The results are shown in Table 6.

TABLE 6

| sample No. | oxide composition | β-OH/ mm | Pt ppm | λ70 nm | T450(H) % | T450(L) % | defoam min |
|---|---|---|---|---|---|---|---|
| 11 | I | 0.83 | 1.70 | 415 | 77.1 | 78.4 | 78 |
| 12 | | 1.14 | 0.61 | 411 | 78.2 | 82.2 | 77 |
| 13 | | 1.18 | 0.49 | 409 | 78.8 | 81.4 | 75 |
| 21 | II | 0.66 | 1.90 | 417 | 76.8 | 72.3 | 87 |
| 22 | | 0.94 | 1.30 | 416 | 77.3 | 78.2 | 84 |
| 23 | | 1.13 | 0.87 | 414 | 77.9 | 79.9 | 83 |
| 24 | | 1.34 | 0.62 | 413 | 78.5 | 80.2 | 76 |
| 31 | III | 0.69 | 1.50 | 429 | 74.6 | 67.8 | 74 |
| 32 | | 1.02 | 1.10 | 426 | 75.7 | 71.2 | 72 |
| 33 | | 1.31 | 0.66 | 421 | 77.1 | 75.0 | 71 |
| 34 | | 1.53 | 0.37 | 420 | 77.3 | 79.3 | 70 |
| 41 | IV | 0.66 | 1.60 | 441 | 72.5 | 62.7 | 84 |
| 42 | | 0.89 | 1.20 | 437 | 73.9 | 70.1 | 82 |
| 43 | | 1.15 | 0.88 | 435 | 74.8 | 73.3 | 75 |
| 44 | | 1.29 | 0.62 | 433 | 75.6 | 73.4 | 71 |
| 51 | V | 0.52 | 1.76 | 473 | 58.0 | 57.4 | 74 |
| 52 | | 0.72 | 0.67 | 460 | 63.8 | 64.1 | 66 |
| 61 | VI | 0.39 | 1.90 | 502 | 54.8 | 25.2 | 94 |
| 62 | | 0.52 | 1.50 | 494 | 57.0 | 44.9 | 88 |
| 63 | | 0.65 | 0.88 | 480 | 61.2 | 56.4 | 83 |

As shown in Table 6, according to the producing method of the present invention, it is to be noted that it is possible to effectively prevent Pt of the melting vessel from being dissolved into the molten glass, so that it is possible to reduce the content of the noble metal in the obtained optical glass sample. Further, the producing method according to the present invention may increase the water content in the obtained optical glass sample, and such an optical glass sample may be dramatically improved in transmittance by the thermal treatment. Furthermore, the producing method according to the present invention may replenish the dissolved gas in the molten glass, and the clarity is improved as the water content of the optical glass sample is increased.

Thus, in the optical glass sample according to the present invention, the content of the noble metal derived from the melting vessel is less than 2 ppm, namely, is low, the value of βOH is 0.1 mm$^{-1}$ or more, and the transmittance is dramatically improved after the thermal treatment, as shown in Table 6. Particularly, the optical glass sample according to the present invention is dramatically reduced in the noble metal content, so that deterioration in transmittance derived from the noble metal is little, and thereby the transmittance is very excellent after the thermal treatment.

Moreover, in the optical glass of the present invention, particularly as can be seen from the results of T450(L), the transmittance may be dramatically improved even by a short-time thermal treatment as the water content of the obtained optical glass goes higher (the βOH value of the glass goes higher). Further, the optical glass of the present invention is excellent in clarity. Accordingly, the transmittance is sufficiently improved by the short-time thermal treatment, and it takes a short time to remove the bubbles. Therefore, the optical glass of the present invention can considerably reduce the time required for the clarification process and the thermal treatment process, and cannot only reduce a production cost but also can improve productivity in the production of the optical glass.

Example 2

Next, optical glass samples were produced by supplying the water vapor as well as the nitrogen gas as the non-oxidizing gas. The optical glass samples were produced in the same method as Example 1 except that the conditions of Table 7 are applied to the oxide compositions I, III and V (samples 11a to 15a, samples 30a to 39a, and samples 41a to 45a).

[Evaluation of Optical Glass]

Various physical properties of the obtained optical glass samples (samples 11a to 15a, samples 30a to 39a, and samples 41a to 45a) were measured and evaluated under the same conditions as Example 1.

Consequently, the refractive index nd, the Abbe's number vd and the glass transition temperature Tg were substantially identical to the values shown in the oxide composition V of Example 1. The results of βOH and Pt content are shown in FIG. 7.

TABLE 7

| | | | | atmospheric adding | | | | |
| sample No. | oxide composition | volume liter | residence time hour | mixture ratio water vapor/N$_2$ vol % | flow rate l/min | β-OH/ mm | Pt ppm | T450(H) % |
|---|---|---|---|---|---|---|---|---|
| 11a | I | 40 | 5.5 | 5/95 | 300 | 0.13 | 0.95 | 78.0 |
| 12a | | 40 | 5.5 | 25/75 | 40 | 0.28 | 1.40 | 77.4 |
| 13a | | 40 | 5.5 | 35/65 | 300 | 0.39 | 0.23 | 79.1 |
| 14a | | 93 | 9.7 | 50/50 | 320 | 0.48 | 0.70 | 78.5 |
| 15a | | 40 | 5.5 | 95/5 | 250 | 0.87 | 1.10 | 77.3 |
| 30a | III | 40 | 4.8 | 5.5/94.5 | 250 | 0.15 | 1.20 | 74.5 |
| 31a | | 40 | 4.8 | 10/90 | 300 | 0.21 | 0.78 | 76.4 |
| 32a | | 6 | 5.0 | 25/75 | 34 | 0.31 | 1.80 | 73.0 |
| 33a | | 40 | 4.8 | 25/75 | 250 | 0.33 | 1.20 | 74.9 |
| 34a | | 40 | 4.8 | 30/70 | 300 | 0.36 | 0.42 | 76.9 |
| 35a | | 40 | 4.8 | 30/70 | 300 | 0.40 | 0.29 | 77.4 |
| 36a | | 40 | 4.8 | 40/60 | 300 | 0.45 | 0.78 | 76.0 |
| 37a | | 40 | 4.8 | 55/45 | 300 | 0.58 | 0.87 | 75.3 |
| 38a | | 40 | 4.8 | 60/40 | 15 | 0.66 | 1.60 | 73.8 |

TABLE 7-continued

| | | | atmospheric adding | | | |
|---|---|---|---|---|---|---|
| sample No. | oxide composition | volume liter | residence time hour | mixture ratio water vapor/$N_2$ vol % | flow rate l/min | β-OH/ mm | Pt ppm | T450(H) % |
| 39a | | 40 | 4.8 | 95.5/4.5 | 300 | 0.96 | 0.51 | 77.4 |
| 41a | V | 6 | 5.0 | 5/95 | 34 | 0.12 | 0.81 | 62.1 |
| 42a | | 40 | 7.3 | 25/75 | 15 | 0.25 | 1.80 | 58.2 |
| 43a | | 40 | 7.3 | 30/70 | 300 | 0.28 | 0.63 | 62.7 |
| 44a | | 40 | 7.3 | 45/55 | 250 | 0.37 | 1.20 | 59.3 |
| 45a | | 40 | 7.3 | 95/5 | 300 | 0.66 | 0.51 | 64.3 |

As shown in Table 7, the optical glass samples (samples 11a to 15a, samples 30a to 39a, and samples 41a to 45a) produced by supplying the non-oxidizing gas together with the water vapor in the melting atmosphere obtained properties comparable to those of the optical glass samples (samples 11 to 13, samples 31 to 34, samples 51 and 52) produced by supplying only the water vapor.

As shown in Examples 1 and 2, the producing method of the present invention may effectively prevent Pt of the melting vessel from being dissolved into the molten glass, and may increase the water content in the obtained optical glass sample. Therefore, the optical glass sample of the present invention has a very small content of noble metal, and may dramatically improve transmittance by the thermal treatment, so that the transmittance is very excellent after the thermal treatment.

(Comparative Experiment)

Next, when the optical glass sample was produced, an optical glass sample (sample CE1) produced by bubbling Ar gas in the melting product, and optical glass samples (samples CE2 to CE4) produced by adopting the air atmosphere as the melting atmosphere were prepared.

Further, the glass composition of each sample was set as shown in Table 8, and a starting raw material was adjusted by the same method as Example 1.

TABLE 8

| sample No. | | CE1 | CE2 | CE3 | CE4 |
|---|---|---|---|---|---|
| glass component (mol %) | $P_2O_5$ | 24.60 | 25.88 | 25.88 | |
| | $TiO_2$ | 31.09 | 31.91 | 33.27 | |
| | $Nb_2O_5$ | 23.08 | 20.59 | 19.11 | |
| | $WO_3$ | 3.46 | 3.48 | 3.62 | |
| | $Bi_2O_3$ | — | — | — | |
| | $B_2O_3$ | — | — | — | |
| | BaO | 1.43 | — | — | |
| | $Na_2O$ | 10.59 | 13.00 | 15.23 | |
| | $K_2O$ | 5.74 | 2.80 | 0.44 | |
| | $SiO_2$ | — | — | — | |
| | SrO | — | 2.33 | 2.43 | |
| | $Sb_2O_3$ | — | 0.01 | 0.01 | |
| | HR | 57.63 | 55.98 | 56.00 | |
| refractive index nd | | 1.95 | 1.95 | 1.95 | |
| Abbe's number vd | | 17.3 | 17.7 | 18.2 | |
| glass transition temperature Tg (° C.) | | 660 | 645 | 650 | |

As for the sample CE1, the optical glass sample was produced in the same method as the sample 33 of Example 1, except that Ar gas (100 volume %) is bubbled at a feed rate of 1.5 l/min in the molten glass in a melting bath, instead of adding the water vapor to the melting atmosphere.

As for the samples CE2 to CE4, the optical glass samples were produced in the same method as the sample 33 of Example 1, except that the water vapor is not added to the melting atmosphere (air atmosphere is adopted).

[Evaluation of Optical Glass]

Various physical properties of the obtained optical glass samples (samples CE1 to CE4) were measured and evaluated in principle under the same conditions as the sample 33 of Example 1.

As for T450(L), the holding temperature was set to 600 degrees Celsius and the holding time was set to 3 hours, instead of the temperature and the time shown in Table 5. Otherwise, T450(L) was measured under the same conditions as Example 1.

The results of the refractive index nd, the Abbe's number vd and the glass transition temperature Tg are shown in Table 8, while the results of βOH, Pt amount and T450(L) are shown in Table 9.

Further, for the purpose of comparison, the results (the data shown in Table 6) of the samples 33 and 43 according to the examples of the present invention are also shown in Table 9. The samples 33 and 43 are optical glass samples according to the examples of the present invention which are produced by adding the water vapor to the melting atmosphere, and have compositions that are relatively similar to the compositions of the samples CE1 to CE4.

TABLE 9

| sample No. | HR mol % | β-OH/ mm | Pt ppm | T450(L) % |
|---|---|---|---|---|
| 33 | 52.96 | 1.31 | 0.66 | 75.0 |
| 43 | 60.90 | 1.15 | 0.88 | 73.3 |
| CE1 | 57.63 | 0.07 | 2.6 | 18.7 |
| CE2 | 57.63 | 0.09 | 3.6 | 25.2 |
| CE3 | 55.98 | 0.08 | 3.0 | 27.8 |
| CE4 | 56.00 | 0.09 | 3.5 | 29.4 |

The sample CE1 is the optical glass sample produced by bubbling Ar gas in the melting product, and the samples CE2 to CE4 are the optical glass samples produced by adopting the air atmosphere as the melting atmosphere. The treatment of adding water vapor to the melting atmosphere and the treatment of bubbling water vapor in the melting product are not performed in the melting process of the aforementioned samples.

These samples CE1 to CE4 have the β-OH value less than 0.1 $mm^{-1}$ as shown in Table 9, and are samples corresponding to the comparative example of the present invention.

Particularly, it is found that the sample CE1 produced by bubbling Ar gas in the molten glass has a lower β-OH value as compared to the samples CE2 to CE4 produced in the air atmosphere. It is believed that such a difference in β-OH occurs because the water vapor concentration in the melting atmosphere of the sample CE1 is lower than that in the melting atmosphere of the samples CE2 to CE4.

As described above, when the sample CE1 is melted, the Ar gas is bubbled in the melting product. Since the Ar gas bubbled in the melting product is substituted with air in the melting furnace and then stays in the melting furnace, the melting atmosphere of the sample CE1 is close to the Ar atmosphere. As a result, in comparison with the melting atmosphere of the samples CE2 to CE4, the air concentration is lowered in the melting atmosphere of the sample CE1.

Some water vapor as well as oxygen, carbon dioxide, nitrogen, or the like is usually contained in the air. Further, the Ar gas used generally is dry gas. Therefore, the supply of the dry Ar gas causes the air concentration in the melting atmosphere to be lowered, and causes the concentration of the water vapor to be relatively lowered.

As described above, the melting atmosphere of the sample CE1 is lower in air concentration than the melting atmosphere of the samples CE2 to CE4. Therefore, it can be said that the concentration of the water vapor in the melting atmosphere of the sample CE1 is lower than that in the melting atmosphere of the samples CE2 to CE4.

If the glass composition is not varied, the β-OH value usually depends on the amount of the water vapor in the melting atmosphere. Therefore, the sample CE1 having a small amount of water vapor in the melting atmosphere is lower in water content contained in the glass than the sample CE2 having the same composition, so that the β-OH value is reduced.

Meanwhile, the same relationship may be applied to the oxygen concentration in the melting atmosphere. That is, if the air concentration in the melting atmosphere is lowered, the oxygen concentration is also lowered. Therefore, it is considered that the sample CE1 having a low air concentration is lower in oxygen concentration, as compared to the melting atmosphere of the samples CE2 to CE4.

Generally, in the same glass composition, as the concentration of oxygen in the melting atmosphere increases, Pt is more easily dissolved. As shown in Table 9, when comparing the samples CE1 and CE2 that have the same glass composition, it is found that the dissolved amount of Pt is smaller in the sample CE1 having a lower oxygen concentration in the melting atmosphere.

As such, if the oxygen concentration in the melting atmosphere is reduced, the dissolved amount of Pt may be reduced. However, if the air in the melting atmosphere is substituted with the inert gas such as an Ar gas when the oxygen concentration is reduced, it is found that the β-OH value of the obtained glass tends to become smaller, in comparison with the case of performing the melting operation in the air atmosphere.

In this regard, the producing method according to the present invention that performs any one of the treatment of adding water vapor to the melting atmosphere and the treatment of bubbling water vapor in the melting product may increase the β-OH value to 0.1 mm$^{-1}$ or more while reducing the Pt amount to 2 ppm or less (samples 33 and 43). That is, the producing method according to the present invention can achieve both the low Pt amount and the high β-OH value (moreover, improvement effect for excellent transmittance).

The samples 33 and 43 according to the example of the present invention are excellent in both the improvement effect of transmittance and the reduction effect of the Pt amount, as compared to the samples CE1 to CE4 corresponding to the comparative example of the present invention, as shown in Table 9.

Generally under the same glass producing conditions, as the HR value increases, T450(L) tends to be reduced. The reason is because Ti, Nb, W and Bi in the glass absorb light of a short wavelength region in the visible light and light absorption also increases as HR increases.

Therefore, it is believed that the sample 43 having the highest HR among six types of glasses has the lowest T450(L), in the case of using the conventional producing method. However, as shown in Table 9, the sample 43 according to the example of the present invention has the higher T450(L) value, as compared to the samples CE1 to CE4 having a lower HR.

Such a tendency is likewise applied to the Pt content. Generally, the higher the HR value is, the more easily Pt tends to be dissolved. Therefore, it is believed that the largest amount of Pt is dissolved in the sample 43 having the highest HR among the six types of glasses, in the case of using the conventional producing method. However, as shown in Table 9, the Pt amount is dramatically reduced in the sample 43 having the higher HR, in comparison with the samples CE1 to CE4 having the low HR.

As such, it is found that higher transmittance is realized and the Pt content is dramatically reduced even in the optical glass having the relatively higher HR, by increasing the β-OH value.

Particularly, a difference in T450(L) value is very remarkable between the samples (samples 33 and 43) according to the examples of the present invention that have high β-OH by performing the treatment of adding water vapor to the melting atmosphere and the samples (samples CE1 to CE4) according to the comparative example wherein the treatment of adding water vapor is not carried out, the Ar gas is bubbled in the melting product or the air atmosphere is adopted as the melting atmosphere, so that β-OH is less than 0.1 mm$^{-1}$. That is, the T450(L) value of the samples 33 and 43 is twice or more as high as that of the samples CE1 to CE4.

As can be seen from this fact, the optical glass having high β-OH may dramatically improve transmittance by the thermal treatment and may drastically improve the transmittance even by a shot-time treatment, in comparison with the optical glass having β-OH less than 0.1 mm$^{-1}$.

The embodiments will be summarized as follows.

The preferred optical glass according to this embodiment is a glass wherein the total content of $TiO_2$, $Nb_2O_5$, $WO_3$ and $Bi_2O_3$ is 35 mol % or more. A glass having the total content of 37 mol % or more is more preferable, a glass having the total content of 38 mol % or more is much more preferable, a glass having the total content of 38.5 mol % or more is even more preferable, a glass having the total content of 39 mol % or more is still more preferable, a glass having the total content of 40 mol % or more is still much more preferable, a glass having the total content of 43 mol % or more is still even more preferable, and a glass having the total content of 50 mol % or more is even much more preferable.

The preferred optical glass according to this embodiment is a glass wherein the content of $P_2O_5$ is greater than the content of $SiO_2$ by mol %.

The preferred optical glass according to this embodiment is a glass wherein the content of $P_2O_5$ is greater than the content of $B_2O_3$ by mol %.

The preferred optical glass according to this embodiment is a glass wherein the content of $P_2O_5$ is greater than a total content of $SiO_2$ and $B_2O_3$ by mol %.

The preferred optical glass according to this embodiment is a glass wherein the content of $P_2O_5$ is 10 mol % or more.

The preferred optical glass according to this embodiment is a glass wherein the content of $P_2O_5$ is 40 mol % or less.

In the preferred optical glass according to this embodiment, the content of $GeO_2$ is 0 to 10 mol %, more preferably 0 to 5 mol %, much more preferably 0 to 3 mol %, even more preferably 0 to 2 mol %, still more preferably 0 to 1 mol %, and still much more preferably 0 to 0.5 mol %.

In the preferred optical glass according to this embodiment, the content of $TeO_2$ is 0 to 10 mol %, more preferably 0 to 5 mol %, much more preferably 0 to 3 mol %, even more preferably 0 to 2 mol %, still more preferably 0 to 1 mol %, and still much more preferably 0 to 0.5 mol %.

The preferred optical glass according to this embodiment has a $Sb_2O_3$ content that is 0 ppm or more and less than 1000 ppm. A more preferable optical glass has a $Sb_2O_3$ content that is 900 ppm or less, a much more preferable optical glass has a $Sb_2O_3$ content that is 800 ppm or less, an even more preferable optical glass has a $Sb_2O_3$ content that is 700 ppm or less, a still more preferable optical glass has a $Sb_2O_3$ content that is 600 ppm or less, and a still much more preferable optical glass has a $Sb_2O_3$ content that is 500 ppm or less. It is more preferable that the $Sb_2O_3$ content becomes lower in order of 400 ppm, 300 ppm, 200 ppm and 100 ppm. $Sb_2O_3$ may not be contained.

In the preferred optical glass according to this embodiment, the total content of $P_2O_5$, $SiO_2$, $B_2O_3$, $TiO_2$, $Nb_2O_5$, $WO_3$, $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ is 90 mol % or more, more preferably 92 mol % or more, much more preferably 95 mol % or more, even more preferably 96 mol % or more, still more preferably 97 mol % or more, still much more preferably 98 mol % or more, and still even more preferably is more than 99 mol %.

In order to reduce a load on environment, it is preferable that Pb, As, Cd, U, Th and Tl are not substantially contained.

The preferred optical glass according to this embodiment is a glass wherein Cu, Cr, Mn, Fe, Co, Ni, V, Mo, Nd, Eu, Er, Tb, Ho and Pr are not substantially contained.

The preferred optical glass according to this embodiment contains noble metal, and the content of the noble metal is less than 2 ppm. It is more preferable that an upper limit of the content of the noble metal contained in the glass becomes lower in order of 1.8 ppm, 1.6 ppm, 1.4 ppm, 1.2 ppm, 1.1 ppm, 1.0 ppm and 0.9 ppm.

The preferred optical glass according to this embodiment contains noble metal, and the content of the noble metal is 1.6 ppm or less. Further, the value of βOH represented by the aforementioned equation (1) ranges from 0.1 to 0.4 $mm^{-1}$.

The preferred optical glass according to this embodiment contains Pt, and the content of Pt is less than 2 ppm. It is more preferable that an upper limit of the content of Pt contained in the glass becomes lower in order of 1.8 ppm, 1.6 ppm, 1.4 ppm, 1.2 ppm, 1.1 ppm, 1.0 ppm and 0.9 ppm.

In the preferred optical glass according to this embodiment, the refractive index nd is 1.75 or more, more preferably 1.80 or more, much more preferably 1.85 or more, and even more preferably 1.90 or more.

In another aspect, a glass material for press molding according to the embodiment is made of an optical glass of the embodiment.

In yet another aspect, an optical element according to the embodiment is made of an optical glass of the embodiment.

In a preferred method for producing an optical glass according to the embodiment, a melting vessel is made of a noble metal material.

In a preferred method for producing an optical glass according to the embodiment, an oxygen partial pressure in the melting vessel in a melting process (i) is lower than an oxygen partial pressure in the air.

A preferred method for producing an optical glass according to the embodiment further includes a process (ii) of discharging the molten glass out from the melting vessel, and a process (iii) of molding the molten glass, and at least one process of the process (ii) and the process (iii) is carried out under an oxidizing atmosphere.

A preferred method for producing an optical glass according to the embodiment further includes a process (iv) of thermally treating the glass, and the process (iv) is carried out under an oxidizing atmosphere.

In a preferred method for producing an optical glass according to the embodiment, the oxidizing atmosphere is higher in oxygen partial pressure than an air atmosphere or air.

In another aspect, a method for producing an optical element according to the embodiment includes a process of producing a glass by a producing method according to the embodiment, and a process of further molding or processing the glass.

In another aspect, a glass material for press molding according to the embodiment is made of an optical glass of the embodiment.

In another aspect, an optical element according to the embodiment is made of an optical glass of the embodiment.

What is claimed is:

1. An optical glass that is a phosphate-based glass containing at least one oxide selected from the group consisting of $TiO_2$, $Nb_2O_5$, $WO_3$ and $Bi_2O_3$,
wherein a total content (HR) of the $TiO_2$, $Nb_2O_5$, $WO_3$ and $Bi_2O_3$ is 35 mol % or more, a content of noble metal is less than 2.0 ppm, and a value of βOH represented by the following equation (1) is 0.1 $mm^{-1}$ or more:

$$\beta OH = -[\ln(B/A)]/t \qquad (1),$$

wherein in the equation (1), t denotes a thickness (mm) of the glass used for a measurement of an external transmittance, A denotes the external transmittance (%) at a wavelength of 2500 nm when a light enters into said glass in parallel to a thickness direction thereof, B denotes the external transmittance (%) at the wavelength of 2900 nm when a light enters into said glass in parallel to the thickness direction thereof, and ln is a natural logarithm.

2. A method for producing an optical glass,
wherein the method has a melting process that obtains a molten glass by heating and melting a glass raw material containing phosphorus and a glass raw material containing at least one component selected from the group consisting of $TiO_2$, $Nb_2O_5$, $WO_3$ and $Bi_2O_3$, in a melting vessel made of noble metal,
a total content (HR) of the $TiO_2$, $Nb_2O_5$, $WO_3$ and $Bi_2O_3$ in the glass raw materials is 35 mol % or more, and
at least one of a treatment (ia) of adding water vapor to a melting atmosphere and a treatment (ib) of bubbling water vapor in a melting product is carried out in the melting process.

3. The method according to claim 2, wherein a non-oxidizing gas is supplied together with the water vapor in either or both of the treatment (ia) and the treatment (ib).

4. The method according to claim 3, wherein the non-oxidizing gas comprises at least one selected from the group consisting of argon, nitrogen, carbon monoxide, carbon dioxide, hydrogen, helium and iodine.

5. The method according to claim 3, wherein a ratio occupied by the water vapor in the gas being supplied is 3 volume % or more and less than 100 volume %, and a ratio occupied by the non-oxidizing gas in the gas being supplied is more than 0 volume % and 97 volume % or less.

6. The method according to claim 2, wherein the optical glass is a phosphate-based glass.

7. The method according to claim 2, further comprising: thermally treating the optical glass under an oxidizing atmosphere.

* * * * *